(12) United States Patent
Yeh et al.

(10) Patent No.: US 11,060,040 B2
(45) Date of Patent: Jul. 13, 2021

(54) BASE STOCKS AND LUBRICANT COMPOSITIONS CONTAINING SAME

(71) Applicant: ExxonMobil Research and Engineering Company, Annandale, NJ (US)

(72) Inventors: Lisa I-Ching Yeh, Marlton, NJ (US); Yogi V. Shukla, Cherry Hill, NJ (US); Pilanda Watkins-Curry, Pine Hill, NJ (US); Camden N. Henderson, Mullica Hill, NJ (US); Kendall S. Fruchey, Easton, PA (US); Michael B. Carroll, Center Valley, PA (US); Adrienne R. Diebold, Lebanon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 117 days.

(21) Appl. No.: 16/529,319

(22) Filed: Aug. 1, 2019

(65) Prior Publication Data
US 2019/0359898 A1   Nov. 28, 2019

Related U.S. Application Data

(62) Division of application No. 15/631,644, filed on Jun. 23, 2017, now Pat. No. 10,400,185.

(Continued)

(51) Int. Cl.
*C10M 101/02* (2006.01)
*C10M 171/02* (2006.01)
(Continued)

(52) U.S. Cl.
CPC ............... *C10G 65/12* (2013.01); *B01D 3/10* (2013.01); *B01D 3/14* (2013.01); *B01J 23/74* (2013.01);
(Continued)

(58) Field of Classification Search
CPC ........ C10G 65/12; C10G 65/00; C10G 67/00; C10G 67/0454; C10G 1/086; C10G 21/14;
(Continued)

(56) References Cited

U.S. PATENT DOCUMENTS 3,414,506 A   12/1968   Van Lookeren
3,902,988 A   9/1975   Bennett et al.
(Continued)

FOREIGN PATENT DOCUMENTS

KR   20030073026 A   9/2003
WO   2004081145 A2   9/2004
WO   2014/175952 A1   10/2014

OTHER PUBLICATIONS

The International Search Report and Written Opinion of PCT/US2017/039006 dated Aug. 30, 2017.
(Continued)

*Primary Examiner* — Pamela H Weiss
(74) *Attorney, Agent, or Firm* — Scott F. Yarnell

(57) ABSTRACT

Systems and methods are provided for block operation during lubricant and/or fuels production from deasphalted oil. During "block" operation, a deasphalted oil and/or the hydroprocessed effluent from an initial processing stage can be split into a plurality of fractions. The fractions can correspond, for example, to feed fractions suitable for forming a light neutral fraction, a heavy neutral fraction, and a bright stock fraction, or the plurality of fractions can correspond to any other convenient split into separate fractions. The plurality of separate fractions can then be processed separately in the process train (or in the sweet portion of the process train) for forming fuels and/or lubricant base stocks. This can allow for formation of unexpected base stock compositions.

21 Claims, 6 Drawing Sheets

| X-Class | 2 | 0 | -2 | -4 | -6 | -8 | -10 |
|---|---|---|---|---|---|---|---|
| Predominant species | iso-Paraffins of formula $C_nH_{2n+2}$ | 1 ring cycloparaffins of formula $C_nH_{2n}$ | 2 ring cycloparaffins of formula $C_nH_{2n-2}$ | 3 ring cycloparaffins of formula $C_nH_{2n-4}$ | 4 ring cycloparaffins of formula $C_nH_{2n-6}$ | 5 ring cycloparaffins of formula $C_nH_{2n-8}$ | 6 ring cycloparaffins of formula $C_nH_{2n-10}$ |
| Example Ring structures | N/A | ○ | ∞ | | | | |
| Minor species (may or may not be present) | Species with Naphthenoaromatic ring structures of formula $C_nH_{2n+Z}$ where Z= -2(Number of rings+ number of double bonds - 1) | | | | | | |
| Example Ring structures | | | | | | | |

Related U.S. Application Data

(60) Provisional application No. 62/439,943, filed on Dec. 29, 2016.

(51) Int. Cl.

| | | |
|---|---|---|
| *C10M 175/00* | (2006.01) | |
| *C10N 20/02* | (2006.01) | |
| *C10N 20/00* | (2006.01) | |
| *C10N 30/02* | (2006.01) | |
| *C10N 30/20* | (2006.01) | |
| *C10G 65/12* | (2006.01) | |
| *C10G 65/00* | (2006.01) | |
| *C10G 67/00* | (2006.01) | |
| *C10G 67/04* | (2006.01) | |
| *B01D 3/10* | (2006.01) | |
| *B01J 23/74* | (2006.01) | |
| *C10C 3/06* | (2006.01) | |
| *C10C 3/08* | (2006.01) | |
| *C10G 1/08* | (2006.01) | |
| *B01D 3/14* | (2006.01) | |
| *C10G 21/14* | (2006.01) | |
| *C10G 45/38* | (2006.01) | |
| *B01L 3/10* | (2006.01) | |
| *C10N 40/25* | (2006.01) | |
| *C10N 70/00* | (2006.01) | |
| *B01D 3/16* | (2006.01) | |
| *C08L 95/00* | (2006.01) | |

(52) U.S. Cl.
CPC .................. *B01L 3/10* (2013.01); *C10C 3/06* (2013.01); *C10C 3/08* (2013.01); *C10G 1/086* (2013.01); *C10G 21/14* (2013.01); *C10G 45/38* (2013.01); *C10G 65/00* (2013.01); *C10G 67/00* (2013.01); *C10G 67/0454* (2013.01); *C10M 101/02* (2013.01); *C10M 171/02* (2013.01); *C10M 175/0033* (2013.01); *B01D 3/16* (2013.01); *C08L 95/00* (2013.01); *C10G 2300/10* (2013.01); *C10G 2300/1062* (2013.01); *C10G 2300/1077* (2013.01); *C10G 2400/08* (2013.01); *C10G 2400/10* (2013.01); *C10M 2201/06* (2013.01); *C10M 2201/062* (2013.01); *C10M 2203/1006* (2013.01); *C10M 2203/1065* (2013.01); *C10M 2207/10* (2013.01); *C10N 2020/011* (2020.05); *C10N 2020/017* (2020.05); *C10N 2020/02* (2013.01); *C10N 2030/02* (2013.01); *C10N 2030/20* (2013.01); *C10N 2040/25* (2013.01); *C10N 2070/00* (2013.01)

(58) Field of Classification Search
CPC ............ C10G 45/38; C10G 2300/1077; C10G 2300/10; C10G 2300/1062; C10G 2400/08; C10G 2400/10; B01L 3/10; C10M 101/02; C10M 171/02; C10M 175/0033; C10M 2203/1065; C10M 2201/06; C10M 2201/062; C10M 2207/10; C10M 2203/1006; C10N 2220/032; C10N 2220/023; C10N 2220/022; C10N 2270/00; C10N 2230/20; C10N 2240/10; C10N 2230/02; C10N 2220/028; C10N 2220/026; C10N 2220/025; C10N 2220/027; C10N 2220/02; C10N 2020/02; C10N 2020/011; C10N 2020/017; C10N 2030/02; C10N 2030/20; C10N 2040/25; C10N 2070/00; B01J 23/74; B01D 3/10; B01D 3/14; B01D 3/16; C10C 3/06; C10C 3/08; C08L 95/00
See application file for complete search history.

(56) References Cited

U.S. PATENT DOCUMENTS

| | | | |
|---|---|---|---|
| 4,125,459 A | 11/1978 | Garwin | |
| 5,021,142 A | 6/1991 | Bortz et al. | |
| 5,302,279 A | 4/1994 | Degnan et al. | |
| 5,372,703 A | 12/1994 | Kamiya et al. | |
| 7,531,083 B2* | 5/2009 | Holmes | C10M 105/04 208/70 |
| 7,704,930 B2 | 4/2010 | Deckman et al. | |
| 7,776,206 B2 | 8/2010 | Miller et al. | |
| 8,648,021 B2* | 2/2014 | Tagawa | C10G 45/58 508/469 |
| 9,206,370 B2* | 12/2015 | Wang | C10M 177/00 |
| 9,418,828 B2 | 8/2016 | Mennito et al. | |
| 2004/0125459 A1 | 7/2004 | Tanitsu et al. | |
| 2005/0077208 A1* | 4/2005 | Miller | C10M 107/02 208/18 |
| 2006/0100466 A1* | 5/2006 | Holmes | C10M 105/04 585/1 |
| 2006/0100467 A1* | 5/2006 | Holmes | H01B 3/22 585/1 |
| 2007/0175974 A1 | 8/2007 | Duininck et al. | |
| 2007/0197405 A1 | 8/2007 | Holmes et al. | |
| 2008/0015400 A1* | 1/2008 | Matsui | C10M 109/02 585/1 |
| 2008/0116108 A1* | 5/2008 | Zhang | G01N 33/30 208/18 |
| 2008/0171675 A1* | 7/2008 | Yeh | C10M 171/02 508/110 |
| 2009/0111936 A1 | 4/2009 | Wedlock | |
| 2011/0003725 A1* | 1/2011 | Matsui | C10M 171/02 508/463 |
| 2011/0237477 A1* | 9/2011 | Tagawa | B01J 29/068 508/469 |
| 2012/0077923 A1* | 3/2012 | Tredget | C10M 111/02 524/476 |
| 2013/0190544 A1* | 7/2013 | Wang | C10M 177/00 585/25 |
| 2013/0217606 A1* | 8/2013 | Wang | C10M 169/041 508/449 |
| 2015/0060329 A1 | 3/2015 | Wedlock | |
| 2016/0194566 A1 | 7/2016 | Hoo et al. | |
| 2017/0283729 A1 | 10/2017 | Pathare et al. | |

OTHER PUBLICATIONS

The International Search Report and Written Opinion of PCT/US2017/039027 dated Sep. 8, 2017.
The International Search Report and Written Opinion of PCT/US2017/039021 dated Nov. 3, 2017.
The International Search Report and Written Opinion of PCT/US2017/039012 dated Sep. 5, 2017.

* cited by examiner

| | | Inv 1 | Inv 2 | Inv 3 | Inv 4 | Inv 5 | Inv 6 | Ref 1 | Ref 2 | Ref 3 | Ref 4 | Ref 5 | Ref 6 | Ref 7 |
|---|---|---|---|---|---|---|---|---|---|---|---|---|---|---|
| 1 | KV100 (cSt) | 11.99 | 11.70 | 12.19 | 11.75 | 11.92 | 11.6 | 10.59 | 10.29 | 11.61 | 12.12 | 12.23 | 10.46 | 11.98 |
| 2 | KV40 (cSt) | 103.4 | 99.7 | 119.0 | 105.6 | 102.1 | 97.8 | 91.7 | 89.8 | 97.3 | 102.1 | 104.9 | 89.2 | 107.8 |
| 3 | VI | 105.5 | 105.8 | 91.3 | 99.0 | 106.2 | 106.7 | 97.7 | 95.1 | 107.6 | 109.5 | 107.5 | 99.0 | 99.9 |
| 4 | Saybolt Color (D6405) | 24 | 23 | 12 | | >30 | >30 | 24 | >30 | >30 | | >30 | >30 | 14 |
| 5 | CCR (D4530) (wt%) | 0.01 | 0.02 | | | 0 | 0.01 | 0.01 | | 0.01 | | | <0.01 | |
| 6 | Pour Point (D5950) (°C) | -16 | -13 | -42 | -42 | -21 | -8 | -17 | -21 | -39 | -24 | -15 | -21- | -21 |
| 7 | Pour Point (D97) (°C) | -12 | -12 | -45 | | -15 | -5 | -13 | -18 | | -21 | | -18 | -18 |
| 8 | Cloud Point (D2500) (°C) | -4 | -7 | <-60 | | -12 | -6 | -12 | -15 | -12 | -11 | -14 | -14 | -23 |
| 9 | Cloud-Pour Spread | -8 | -6 | | | -3 | -1 | -1 | -2 | | -10 | | -4 | 5 |
| 10 | | | | | | | | | | | | | | |
| 11 | Total Saturates (D7419) (wt%) | All measured or estimated at 99.8 or more | | | | | | 99.5 | 99.5 | | >99.8 | >99.8 | 99.6 | 99.7 |
| 12 | SimDis, IBP (°C) | 397 | 382 | 379 | 393 | 433 | 429 | 322 | 303 | 362 | 443 | 386 | 369 | 393 |
| 13 | SimDis, 5 wt% (°C) | 439 | 432 | 434 | 448 | 461 | 459 | 366 | 369 | 396 | 469 | 438 | 404 | 437 |
| 14 | SimDis, 10 wt% (°C) | 456 | 451 | 451 | 463 | 473 | 471 | 391 | 396 | 412 | 480 | 458 | 421 | 453 |
| 15 | SimDis, 30 wt% (°C) | 489 | 487 | 483 | 492 | 498 | 495 | 452 | 453 | 457 | 503 | 494 | 466 | 488 |
| 16 | SimDis, 50 wt% (°C) | 512 | 510 | 505 | 511 | 513 | 511 | 494 | 491 | 501 | 519 | 517 | 495 | 508 |
| 17 | SimDis, 70 wt% (°C) | 534 | 533 | 525 | 529 | 529 | 527 | 529 | 522 | 546 | 534 | 539 | 517 | 526 |
| 18 | SimDis, 90 wt% (°C) | 565 | 563 | 552 | 555 | 552 | 551 | 567 | 558 | 609 | 556 | 571 | 547 | 551 |
| 19 | SimDis, 95 wt% (°C) | 578 | 575 | 564 | 567 | 563 | 562 | 582 | 572 | 638 | 565 | 585 | 561 | 563 |
| 20 | SimDis, FBP (°F) | 618 | 602 | 589 | 603 | 600 | 594 | 615 | 606 | 706 | 594 | 624 | 594 | 598 |
| 21 | Epsilon (13C-NMR) (%) | 14.58 | 13.81 | 6.07 | 8.01 | 13.72 | 13.97 | | 12.00 | 11.42 | 12.49 | 13.60 | 11.80 | 12.95 |
| 22 | Alpha (13C-NMR) (%) | 2.90 | 2.67 | 2.39 | 2.58 | 2.83 | 2.79 | | 2.84 | 2.60 | 2.77 | 2.63 | 2.74 | 2.74 |
| 23 | T/P Pr (13C-NMR) (%) | 0.73 | 0.81 | 1.19 | 1.13 | 0.80 | 0.80 | | 0.78 | 0.98 | 0.99 | 0.80 | 1.25 | 0.76 |
| 24 | Total Paraffins (GC-MS) (wt%) | 17.9 | 16.4 | 20.5 | 25.3 | 25.2 | 25.3 | 22.4 | 20.2 | 26.8 | 24.0 | 19.4 | 18.9 | 17.3 |
| 25 | Naphthenes (GC-MS) (wt%) | 82.1 | 83.6 | 79.5 | 74.7 | 74.8 | 74.7 | 77.6 | 79.8 | 73.2 | 76.0 | 80.6 | 81.1 | 82.7 |
| 26 | 1-Ring (GC-MS) (wt%) | 45.3 | 42.7 | 39.2 | 40.6 | 41.3 | 40.9 | 42.2 | 38.6 | 39.2 | 37.0 | 38.7 | 35.4 | 37.1 |
| 27 | 2-Ring (GC-MS) (wt%) | 27.1 | 30.2 | 30.3 | 25.2 | 24.8 | 24.9 | 22.2 | 26.5 | 24.4 | 28.3 | 30.5 | 30.1 | 31.2 |
| 28 | 3-Ring (GC-MS) (wt%) | 7.3 | 8.1 | 7.7 | 6.6 | 6.5 | 6.7 | 8.2 | 10.1 | 6.5 | 7.9 | 8.5 | 10.8 | 10.2 |
| 29 | 4-Ring (GC-MS) (wt%) | 1.1 | 1.8 | 1.6 | 1.2 | 1.2 | 1.3 | 3.1 | 2.6 | 2.0 | 2.0 | 2.0 | 3.1 | 2.8 |
| 30 | 5-Ring (GC-MS) (wt%) | 0.9 | 0.6 | 0.5 | 0.8 | 0.8 | 0.8 | 1.4 | 1.4 | 0.8 | 0.6 | 0.6 | 1.3 | 1.0 |
| 31 | 6-Ring (GC-MS) (wt%) | 0.4 | 0.2 | 0.1 | 0.3 | 0.2 | 0.3 | 0.6 | 0.5 | 0.3 | 0.3 | 0.3 | 0.5 | 0.5 |
| 32 | 2+Naphthenes (GC-MS) (wt%) | 36.8 | 40.9 | 40.3 | 34.1 | 33.5 | 33.9 | 35.5 | 41.2 | 34.0 | 39.1 | 42.0 | 45.7 | 45.7 |
| 33 | 3+Naphthenes (GC-MS) (wt%) | 9.7 | 10.7 | 9.9 | 8.9 | 8.7 | 9.0 | 13.3 | 14.6 | 9.6 | 10.8 | 11.4 | 15.6 | 14.4 |
| 34 | 4+Naphthenes (GC-MS) (wt%) | 2.4 | 2.6 | 2.2 | 2.3 | 2.2 | 2.3 | 5.1 | 4.6 | 3.1 | 2.9 | 2.9 | 4.8 | 4.3 |
| 35 | 1R/2R+ (GC-MS) (wt%) | 1.23 | 1.04 | 0.97 | 1.19 | 1.23 | 1.21 | 1.19 | 0.94 | 1.15 | 0.95 | 0.92 | 0.77 | 0.81 |
| 36 | Cycloparaffin Perform Ratio | 1.31 | 0.88 | 0.82 | 1.25 | 1.31 | 1.29 | 1.00 | 1.00 | 1.15 | 1.18 | 1.15 | 0.97 | 1.01 |

FIG. 2

| | | Ref 1 | Ref 2 | Inv 1 | Inv 2 | Inv 3 | Inv 4 | Ref 3 | Ref 4 | Ref 5 |
|---|---|---|---|---|---|---|---|---|---|---|
| 1 | KV100 (cSt) | 5.5 | 5.4 | 5.3 | 5.6 | 5.3 | 5.6 | 5.3 | 5.3 | 5.3 |
| 2 | KV40 (cSt) | 31.2 | 30.2 | 29.6 | 32.7 | 32.4 | 32.7 | 30.6 | 30.1 | 30.7 |
| 3 | VI | 112 | 113 | 110 | 110 | 93 | 106 | 104 | 109 | 107 |
| 4 | Pour Point (D97) (°C) | -19 | -18 | -21 | -18 | <-60 | -24 | -9 | -21 | -15 |
| 5 | Cloud Point (D2500) (°C) | -15 | -15 | -19 | -19 | | -24 | -10 | -23 | -11 |
| 6 | Cloud-Pour Spread | -4 | -3 | -2 | -1 | | 0 | 1 | 2 | -4 |
| 7 | | | | | | | | | | |
| 8 | Total Cycloparaffins (SFC) (wt%) | 75.8 | 73.7 | 84.4 | 86.4 | 83.9 | 87.0 | 79.0 | 77.1 | 80.9 |
| 9 | Sats X O (1 Ring CP) (SFC + GCMS) (wt%) | 40.6 | 38.9 | 50.5 | 49.3 | 44.1 | 46.0 | 38.0 | 37.1 | 40.2 |
| 10 | Sats X -2 (1 Ring CP) (SFC + GCMS) (wt%) | 23.9 | 24.5 | 24.9 | 26.9 | 29.7 | 29.4 | 26.9 | 27.4 | 27.7 |
| 11 | Sats X -4 (1 Ring CP) (SFC + GCMS) (wt%) | 8.1 | 7.7 | 6.5 | 7.4 | 8.2 | 8.7 | 10.0 | 9.2 | 9.4 |
| 12 | Sats X -6 (1 Ring CP) (SFC + GCMS) (wt%) | 2.2 | 1.9 | 1.5 | 1.7 | 1.4 | 2.1 | 2.8 | 2.2 | 2.4 |
| 13 | Sats X -8 (1 Ring CP) (SFC + GCMS) (wt%) | 0.8 | 0.6 | 0.8 | 0.9 | 0.5 | 0.9 | 1.1 | 0.9 | 1.0 |
| 14 | Sats X -10 (1 Ring CP) (SFC + GCMS) (wt%) | 0.2 | 0.1 | 0.2 | 0.2 | 0.1 | 0.1 | 0.3 | 0.2 | 0.3 |
| 15 | Sats X +2 (1 Ring CP) (SFC + GCMS) (wt%) | 24.3 | 26.3 | 15.6 | 13.6 | 16.1 | 13.0 | 21.0 | 22.9 | 19.1 |
| 16 | MM-Paraffins (SFC + GCMS) (wt%) | 1.8 | 1.8 | 1.7 | 1.4 | 0.4 | 1.4 | 1.9 | 1.6 | 1.6 |
| 17 | DM-Paraffins (SFC + GCMS) (wt%) | 22.5 | 24.5 | 13.9 | 12.2 | 15.7 | 11.4 | 19.1 | 21.3 | 17.5 |
| 18 | Cycloparaffin Perform Ratio (SFC + GCMS) (wt%) | 1.0 | 1.0 | 1.3 | 1.2 | 1.1 | 1.1 | 0.9 | 0.9 | 1.0 |
| 19 | 2+R cycloparaffins (SFC+GCMS)(wt%) | 35.2 | 34.8 | 34.0 | 37.1 | 39.8 | 41.2 | 41.0 | 40.0 | 40.7 |
| 20 | 3+R cycloparaffins (SFC+GCMS)(wt%) | 11.3 | 10.3 | 9.1 | 10.2 | 10.1 | 11.9 | 14.2 | 12.5 | 13.0 |
| 21 | 4+R cycloparaffins (SFC+GCMS)(wt%) | 3.2 | 2.4 | 2.6 | 2.8 | 1.9 | 3.2 | 4.1 | 3.3 | 3.6 |
| 22 | 5+R cycloparaffins (SFC+GCMS)(wt%) | 1.1 | 0.7 | 1.1 | 1.1 | 0.6 | 1.1 | 1.4 | 1.1 | 1.3 |
| 23 | Epsilon (13C-NMR) (%) | 12.4 | 13.0 | 12.0 | 11.9 | 4.9 | 10.7 | 9.1 | 9.6 | 12.5 |

FIG. 3

BASE STOCKS AND LUBRICANT COMPOSITIONS CONTAINING SAME

CROSS-REFERENCE TO RELATED APPLICATIONS

This application is a divisional application filed under 37 C.F.R. 1.53(b) of parent U.S. patent application Ser. No. 15/631,644 the entirety of which is hereby incorporated herein by reference, and claims priority to U.S. Non-Provisional patent application Ser. No. 15/631,644 filed on Jun. 23, 2017, which claims priority to U.S. Provisional Application Ser. No. 62/439,943 filed Dec. 29, 2016, which is also herein incorporated by reference in its entirety.

This application is related to three other co-pending U.S. applications, filed on even date herewith, and identified by the following U.S. Patent Application Nos. and titles: Ser. No. 16/359,403 entitled "Block Processing Configurations For Base Stock Production From Deasphalted Oil"; Ser. No. 15/631,675 entitled "Block Processing For Base Stock Production From Deasphalted Oil" and Ser. No. 15/631,540 entitled "Block Processing With Bulk Catalsyts For Base Stock Production From Deasphalted Oil". Each of these co-pending U.S. applications is hereby incorporated by reference herein in its entirety.

FIELD

This disclosure relates to base stocks, blends of base stocks, formulated lubricant compositions containing the base stocks, and uses of base stocks.

BACKGROUND

Engine oils are finished crankcase lubricants intended for use in automobile engines and diesel engines and consist of two general components, namely, a base stock or base oil (one base stock or a blend of base stocks) and additives. Base oil is the major constituent in these finished lubricants and contributes significantly to the properties of the engine oil. In general, a few lubricating base oils are used to manufacture a variety of engine oils by varying the mixtures of individual lubricating base oils and individual additives.

Governing organizations (e.g., the American Petroleum Institute) help to define the specifications for engine oils. Increasingly, the specifications for engine oils are calling for products with excellent low temperature properties and high oxidation stability. Currently, only a small fraction of the base oils blended into engine oils are able to meet the most stringent of the demanding engine oil specifications. Currently, formulators are using a range of base stocks spanning the range including Group I, II, III, IV, and V to formulate their products.

Base oils are generally recovered from the higher boiling fractions recovered from a vacuum distillation operation. They may be prepared from either petroleum-derived or from syncrude-derived feed stocks. Additives are chemicals which are added to improve certain properties in the finished lubricant so that it meets the minimum performance standards for the grade of the finished lubricant. For example, additives added to the engine oils may be used to improve stability of the lubricant, increase its viscosity, raise the viscosity index, and control deposits. Additives are expensive and may cause miscibility problems in the finished lubricant. For these reasons, it is generally desirable to lower the additive content of the engine oils to the minimum amount necessary to meet the appropriate requirements.

Formulations are undergoing changes driven by need for increased quality. Changes are seen in engine oils with need for excellent low temperature properties and oxidation stability and these changes continue as new engine oils categories are being developed. Industrial oils are also being pressed for improved quality in oxidation stability, cleanliness, interfacial properties, and deposit control.

Generally, feedstocks suitable for formation of lubricant base oils correspond to vacuum gas oil boiling range feeds from a vacuum distillation. In some situations, however, a deasphalted oil formed by propane desaphalting of a vacuum resid has been conventionally used for additional lubricant base stock production. Deasphalted oils can potentially be suitable for production of heavier base stocks, such as bright stocks. However, the severity of propane deasphalting required in order to make a suitable feed for lubricant base stock production typically results in a yield of only about 30 wt % deasphalted oil relative to the vacuum resid feed.

Despite advances in lubricating base oils and lubricant oil formulation technology, there exists a need for formulated oils that can be formed from non-traditional and/or challenged feeds while still providing desirable characteristics and performance in lubricant applications (for example, for engine oils and industrial oils).

U.S. Pat. No. 3,414,506 describes methods for making lubricating oils by hydrotreating pentane-alcohol-deasphalted short residue. The methods include performing deasphalting on a vacuum resid fraction with a deasphalting solvent comprising a mixture of an alkane, such as pentane, and one or more short chain alcohols, such as methanol and isopropyl alcohol. The deasphalted oil is then hydrotreated, followed by solvent extraction to perform sufficient VI uplift to form lubricating oils.

U.S. Pat. No. 7,776,206 describes methods for catalytically processing resids and/or deasphalted oils to form bright stock. A resid-derived stream, such as a deasphalted oil, is hydroprocessed to reduce the sulfur content to less than 1 wt % and reduce the nitrogen content to less than 0.5 wt %. The hydroprocessed stream is then fractionated to form a heavier fraction and a lighter fraction at a cut point between 1150° F.-1300° F. (620° C.-705° C.). The lighter fraction is then catalytically processed in various manners to form a bright stock.

SUMMARY

This disclosure relates to base stocks and to formulated lubricant compositions containing the base stocks, such as base stocks derived from non-traditional and/or challenged feeds. During "block" operation, a deaspahlted oil and/or the hydroprocessed effluent from an initial processing stage can be split into a plurality of fractions. The fractions can correspond, for example, to feed fractions suitable for forming a light neutral fraction, a heavy neutral fraction, and a bright stock fraction, or the plurality of fractions can correspond to any other convenient split into separate fractions. The plurality of separate fractions can then be processed separately in the process train (or in the sweet portion of the process train) for forming fuels and/or lubricant base stocks. This can allow for formation of unexpected base stock compositions.

BRIEF DESCRIPTION OF THE DRAWINGS

FIG. 2 shows the composition and properties of exemplary high viscosity base stocks of this disclosure compared with the composition of reference high viscosity base stocks.

FIG. 3 shows the composition and properties of exemplary low viscosity base stocks of this disclosure compared with the composition of reference low viscosity base stocks.

DETAILED DESCRIPTION

Figure 1:
FIG. 1 shows illustrative multi-ring cycloparaffins and naphthenoaromatics of X-class and Z-class according to an embodiment of the disclosure.

All numerical values within the detailed description and the claims herein are modified by "about" or "approximately" the indicated value, and take into account experimental error and variations that would be known to a person of ordinary skill in the art.

The viscosity-temperature relationship of a lubricating oil is one of the criteria which can be considered when selecting a lubricant for a particular application. Viscosity Index (VI) is an empirical, unitless number which indicates the rate of change in the viscosity of an oil within a given temperature range. VI is determined according to ASTM method D 2270-93 [1998]. VI is related to kinematic viscosities measured at 40° C. and 100° C. using ASTM Method D 445-01.

As used herein, the term "major component" means a component (e.g., base stock) present in a lubricating oil of this disclosure in an amount greater than about 50 weight percent.

As used herein, the term "minor component" means a component (e.g., one or more lubricating oil additives) present in a lubricating oil of this disclosure in an amount less than about 50 weight percent.

Lubricating Oil Base Stocks

In accordance with this disclosure, base oil compositions and/or lubricating oil base stocks are provided having different relative amounts of monocycloparaffin and multi-ring cycloparaffin species and/or naphthenoaromatic species than known previously for commercial base stocks. Additionally or alternately, the base oil compositions and/or lubricating oil base stocks can include an unexpectedly high percentage of epsilon carbons, an unexpectedly low amount of terminal and pendant propyl groups, an unexpectedly high amount of single ring cycloparaffins, an unexpectedly low amount of 4+ ring cycloparaffins and naphthenoaromatics, or a combination thereof. Further additionally or alternately, the base oil compositions and/or lubricating oil base stocks can have an unexpectedly high content of cycloparaffins and/or a high cycloparaffin performance ratio, as defined herein. The base stocks can be produced, for example, by hydroprocessing of challenged feedstocks such as high lift deasphalted oils. The high lift deasphalted oils can then be processed in a two-stage hydroprocessing system. The first stage can hydrotreat and/or hydrocrack the feed. The second stage can be operated for block processing, and can (optionally) hydrocrack, dewax, and perform aromatic saturation. In other aspects, the base stocks can be produced by performing solvent extraction on a vacuum gas oil boiling range feed, followed by hydrotreatment, hydrocracking, dewaxing, and aromatic saturation of the solvent extracted feed. The base stocks can correspond to base stocks with a kinematic viscosity at 100° C. of 4.0 to 6.0 cSt (light neutral base stocks), base stocks with a kinematic viscosity at 100° C. of 9.0 cSt to 14.0 cSt (heavy neutral base stocks), or base stocks with any convenient kinematic viscosity of less than 15.0 cSt.

The base stocks described herein generally have a total saturates content, as measured by ASTM D7419, of 98.0 wt % or greater, or 99.0 wt % or greater, or 99.8 wt % or greater. Due to the high content of saturates, the amount of aromatics, including naphthenoaromatics, is correspondingly low. It is noted that some measurement techniques for characterizing ring structures, such as gas chromatography/mass spectrometry (GCMS) may not distinguish between a fully saturated multi-ring cylcoparaffin and a naphthenoaromatic structure having the same number of rings. Due to the low content of aromatics of any type, the amount of saturated multi-ring compounds having a specified number of rings is substantially the same as the combined amount of saturated compounds plus naphthenoaromatics having the same number of rings to within the precision of the values described herein. To simplify the description of the base stocks described herein, amounts of multi-ring compounds within a base stock will be described as amounts of (saturated) cycloparaffins plus naphthenoaromatics. However, due to the low content of aromatics of any type, it is understood that such amounts of multi-ring compounds (including measured values) can also be viewed as simply an amount of cycloparaffins within a base stock.

The base stocks described herein generally have physical properties, such as viscosity index and pour point, that are suitable for use in a broad range of finished lubricant applications. Base stocks produced according to the methods described herein were clear and bright, and nearly water white. Performance of the base stocks in oxidation, deposit testing, and low temperature properties was also generally acceptable.

As used herein, multi-ring cycloparaffins and naphthenoaromatics can be categorized as X-class and Z-class. FIG. 1 shows illustrative multi-ring cycloparaffins and naphthenoaromatics of X-class and Z-class according to an embodiment of the disclosure. Referring to FIG. 1, the addition of paraffinic side chains to any ring structure will not change the X-class. This can be seen in the predominant species, as a saturated alkyl side chain would be of the formula $C_mH_{2m}$. So the addition of $C_mH_{2m}$ to $C_nH_{2n+x} = C_{(n+m)}H_{2(n+m)+x}$ which is still of the formula $C_nH_{2n+x}$.

Further, referring to FIG. 1, alkyl naphthenoaromatic species obey the formula $C_nH_{2n+z}$, with Z=−2 (rings+double bonds −1); giving the Z-class of the molecule. Z-class translates to X-class by a wrap-around. So, up to Z=−10, X-class and Z-class are identical. But Z-class of −12 is same as X-class of +2; Z-class of −14 is same as X-class of 0; and so on given by the formula: (multiples of) 14 minus Z-class, such that X-class of 2, 0, −2, −4, −6, −8 or −10 is obtained. Z-class will also work for hetero-naphthenoaromatic species having the formula $C_nH_{2n+z}Y$ where Y is a heteroatom (S, N, and the like). It is noted that the base stocks described herein correspond to base stocks with very little content of heteroatomic hydrocarbon species. The Z-class definition is described by Klaus H. Altgelt and Mieczyslaw M. Boduszynski, Composition and Analysis of Heavy Petroleum Fractions, CRC Press, 1993.

In accordance with this disclosure, the base stocks with unexpected compositions (examples in FIGS. 2 and 3) exhibit a range of base stock viscosities from 3.5 cst to 13 cst.

As an example, the absolute value of single ring naphthenes as shown in FIG. 2 (row 26) and FIG. 3 (row 7) is higher in the base stocks of this disclosure as compared to commercially known base stocks across the range of viscosities. Specifically, the example base stocks of this disclosure show 39.0 wt % or more species with 0 X-class (1 ring cycloparaffins), or 40.0 wt % or more, or 41.0 wt % or more, or 42.0 wt % or more, or 43.0 wt % or more, or 44.0 wt % or more. Additionally or alternately, in the base stocks of this disclosure, the absolute value of 4-ring cycloparaffins as shown in FIG. 2 (row 29) and FIG. 3 (row 10) is lower in the base stocks of this disclosure as compared to commercially known base stocks across the range of viscosities. Specifically, the example base stocks of this disclosure show 2.1 wt % or less species with −6 X-class (4-ring cycloparaffins and naphthenoaromatics), or 2.0 wt % or less, or 1.8 wt % or less, or 1.6 wt % or less, or 1.4 wt % or less. Additionally or alternately, the example base stocks show 3.2 wt % or less of 4+-ring naphthenes, or 2.8 wt % or less, or 2.6 wt % or less, or 2.4 wt % or less. Additionally or alternately, in the base stocks of this disclosure, the total amount of saturated ring structures (cycloparaffins) as shown in FIG. 2 (row 25) and FIG. 3 (row 6) is higher in the base stocks of this disclosure as compared to commercially known base stocks across the range of viscosities. Specifically, the example base stocks of this disclosure show 74.0 wt % or more total naphthenes, or 80.0 wt % or more, or 81.0 wt % or more, or 82.0 wt % or more, or 83.0 wt % or more, or 84.0 wt % or more, or 85.0 wt % or more.

Additionally or alternately, in some aspects the high viscosity base stocks show a lower degree of branching on the iso-paraffin portion of the species as evidenced by 13.5 epsilon carbon atoms per 100 carbon atoms or more as measured by $^{13}$C-NMR, or 13.7 or more, or 14.0 or more, and/or a reduced number of terminal and pendant propyl groups per 100 carbon atoms corresponding to less than 0.82 terminal and pendant propyl groups per 100 carbon atoms, or less than 0.80, or less than 0.75. In some aspects, the high viscosity base stocks show a higher degree of branching on the iso-paraffin portion of the species as evidenced by less than 9.0 epsilon carbon atoms per 100 carbon atoms as measured by $^{13}$C-NMR, and/or an increased number of terminal and pendant propyl groups per 100 carbon atoms corresponding to greater than 1.10 terminal and pendant propyl groups per 100 carbon atoms, or greater than 1.15.

Additionally or alternately, in some aspects the low viscosity base stocks show a lower degree of branching on the iso-paraffin portion of the species as evidenced by 8.0 epsilon carbon atoms per 100 carbon atoms or less, or 6.0 or less, as measured by $^{13}$C-NMR.

Additionally or alternately, in some aspects the high viscosity base stocks can show a ratio of 1-ring naphthenes to 2+-ring naphthenes of 1.0 or more, or 1.1 or more, or 1.2 or more. Additionally or alternately, the high viscosity base stocks can include 2.79 alpha carbon atoms or more per 100 carbon atoms, or 2.85 or more. Additionally or alternately, the high viscosity base stocks can include 9.5 wt % or less of 3+-ring naphthenes, or 9.0 wt % or less.

Additionally or alternately, in some aspects the low viscosity base stocks can include 9.0 wt % or less of 3-ring naphthenes, or 8.5 wt % or less, or 7.5 wt % or less. Additionally or alternately, in some aspects the low viscosity base stocks can include 43.0 wt % or more of 1-ring naphthenes, or 45.0 wt % or more, or 47.0 wt % or more. Additionally or alternately, in some aspects the low viscosity base stocks can include 2.9 wt % or less of 4+-ring naphthenes, or 2.8 wt % or less, or 2.6 wt % or less. Additionally or alternately, in some aspects the low viscosity base stocks can include 12.0 wt % or less of 3+-ring naphthenes, or 11.0 wt % or less, or 10.5 wt % or less, or 9.5 wt % or less. Additionally or alternately, in some aspects the low viscosity base stocks can 16.0 wt % or less of multi-branched paraffins, or 14.0 wt % or less. Additionally or alternately, in some aspects the low viscosity base stocks can include 8.0 epsilon carbon atoms or less per 100 carbon atoms.

In some aspects, the low viscosity base stocks can include 1.6 wt % or less of 4-ring naphthenes; and/or 0.6 wt % or less of 5-ring naphthenes; and/or 2.0 wt % or less of 4+-ring naphthenes; and/or 0.7 wt % or less of 5+-ring naphthenes. In such aspects, the low viscosity base stocks can include 45.0 wt % or more of 1-ring naphthenes, or 47.0 wt % or more, or 49.0 wt % or more; and/or 81.0 wt % or more of total naphthenes, or 83.0 wt % or more.

Additionally or alternately, the differences in composition include a difference in distribution of the cycloparaffin (and naphthenoaromatic) ring species and lead to larger relative amounts of one ring cycloparaffins compared to multi-ring cycloparaffins (and naphthenoaromatics). FIGS. 2 and 3, referring to line 36 and 16 respectively, show a cycloparaffin performance ratio of 1.2 to 1.34.

The cycloparaffin performance ratio for base stocks having a kinematic viscosity at 100° C. of greater than 8 cSt, i.e., the cycloparaffin performance ratio of the high viscosity base stocks of the present disclosure, was calculated as the ratio of monocycloparaffinic (hydrogen deficiency X-class of 0) to multi-ring cycloparaffinic and naphthenoaromatic species (sum of species with hydrogen deficiency X-class of −2, −4, −6, −8 and −10) in said base stock relative to the same ratio in a heavy neutral Group II commercially available sample in 2016 or earlier with a kinematic viscosity at 100° C. within 0.3 cSt as the test sample, wherein the amounts of monocycloparaffinic to multi-ring cycloparaffinic and naphthenoaromatic species are all measured using GCMS on the same instrument at the same calibration.

Similarly, for base stocks with a kinematic viscosity at 100° C. lower than 8 cSt, i.e., the cycloparaffin performance ratio of the low viscosity base stocks of the present disclosure, the cycloparaffin performance ratio was calculated as the ratio of monocycloparaffinic (hydrogen deficiency X-class of 0) to multi-ring cycloparaffinic and naphthenoaromatic species (sum of species with hydrogen deficiency X-class of −2, −4, −6, −8 and −10) in said base stock relative to same ratio in a light neutral Group II commercially available sample in 2016 or earlier with a kinematic viscosity at 100° C. within 0.3 cSt as the test sample, wherein the amounts of monocycloparaffinic to multi-ring cycloparaffinic and naphthenoaromatic species are all measured using GCMS on the same instrument at the same calibration.

A detailed summary of compositional characteristics of exemplary base stocks of this disclosure included in FIGS. 2 and 3 is set forth below.

With regard to formation of formulated lubricants, the base oil constitutes the major component of the engine or other mechanical component oil lubricant composition of the present disclosure and typically is present in an amount ranging from about 50 to about 99 weight percent, preferably from about 70 to about 95 weight percent, and more preferably from about 85 to about 95 weight percent, based on the total weight of the composition. As described herein, additives constitute the minor component of the engine or other mechanical component oil lubricant composition of the present disclosure and typically are present in an amount ranging from about less than 50 weight percent, preferably less than about 30 weight percent, and more preferably less than about 15 weight percent, based on the total weight of the composition.

Mixtures of base oils may be used if desired, for example, a base stock component and a cobase stock component. The cobase stock component is present in the lubricating oils of this disclosure in an amount from about 1 to about 99 weight percent, preferably from about 5 to about 95 weight percent, and more preferably from about 10 to about 90 weight percent. In a preferred aspect of the present disclosure, the low-viscosity and the high viscosity base stocks are used in the form of a base stock blend that comprises from 5 to 95 wt. % of the low-viscosity base stock and from 5 to 95 wt. % of the high-viscosity base stock. Preferred ranges include from 10 to 90 wt. % of the low-viscosity base stock and from 10 to 90 wt. % of the high-viscosity base stock. The base stock blend is most usually used in the engine or other mechanical component oil lubricant composition from 15 to 85 wt. % of the low-viscosity base stock and from 15 to 85 wt. % of the high-viscosity base stock, preferably from 20 to 80 wt. % of the low-viscosity base stock and from 20 to 80 wt. % of the high-viscosity base stock, and more preferably from 25 to 75 wt. % of the low-viscosity base stock and from 25 to 75 wt. % of the high-viscosity base stock.

In a first preferred aspect of the present disclosure, the low-viscosity base stock of the present disclosure is used in the engine or other mechanical component oil lubricant composition in an amount ranging from about 50 to about 99 weight percent, preferably from about 70 to about 95 weight percent, and more preferably from about 85 to about 95 weight percent, based on the total weight of the composition, or for instance as the sole base oil. In a second preferred aspect of the present disclosure, the high-viscosity base stock of the present disclosure is used in the engine or other mechanical component oil lubricant composition in an amount ranging from about 50 to about 99 weight percent, preferably from about 70 to about 95 weight percent, and more preferably from about 85 to about 95 weight percent, based on the total weight of the composition, or for instance as the sole base oil.

Lubricating oil base stock compositions can be determined using a combination of advanced analytical techniques including gas chromatography mass spectrometry (GCMS), supercritical fluid chromatography (SFC), and carbon-13 nuclear magnetic resonance ($^{13}$C-NMR), proton nuclear magnetic resonance (proton-NMR). Examples of low viscosity lubricating oil base stocks according to an embodiment of this disclosure and having a kinematic viscosity at 100° C. in the range of 4-6 cSt are described in FIG. 3. Examples of high viscosity lubricating oil base stocks according to an embodiment of this disclosure and having a kinematic viscosity at 100° C. in the range of 4-6 cSt are described in FIG. 2. Kinematic viscosity of lubricating oils and lubricating base stocks are measured according to ASTM Test Method D445. For reference, the low (high) viscosity lubricating oil base stocks of this disclosure are compared with typical Group II low (high) viscosity base stocks having the same viscosity range.

The base stocks of the instant disclosure can have a kinematic viscosity at 100° C. of greater than or equal to 3.5 cSt, or greater than or equal to 4 cSt, or greater than or equal to 6 cSt, or greater than or equal to 8.5 cSt, or greater than or equal to 9.0 cSt, or greater than or equal to 10 cSt and/or 15 cSt or less, or 14 cSt or less, or 12 cSt or less, or 10 cSt or less, or 8.0 cSt or less, or 6.5 cSt or less, or 6.0 cSt or less.

Lubricant compositions including the inventive base stocks yield a viscosity Index of from 80 to 120, or 90 to 120, or 100 to 120, or 90 to 110. The pour point as measured by ASTM B3983 or D5950-1 test of the lubricant compositions including the inventive base stocks ranges from −6° C. to −60° C., or less than −12, or less than −15, or less than −20, or less than −30, or less than −40° C.

The base stocks of the instant disclosure produced by the integrated hydrocracking and dewaxing process disclosed herein also have low aromatics prior to hydrofinishing. As measured by the STAR 7 test method as described in the U.S. Pat. No. 8,114,678, the disclosure of which is incorporated herein by reference), the saturates are greater than or equal to 98 wt. %, or greater than or equal to 99 wt. %, or greater than or equal to 99.5 wt. %, or greater than or equal to 99.8 wt %, while the corresponding aromatics are less than or equal to 2.0 wt. %, or less than or equal to 1.0 wt. %, less than or equal to 0.5 wt %, or less than or equal to 0.2 wt %.

CONFIGURATION EXAMPLES

Figure 4:
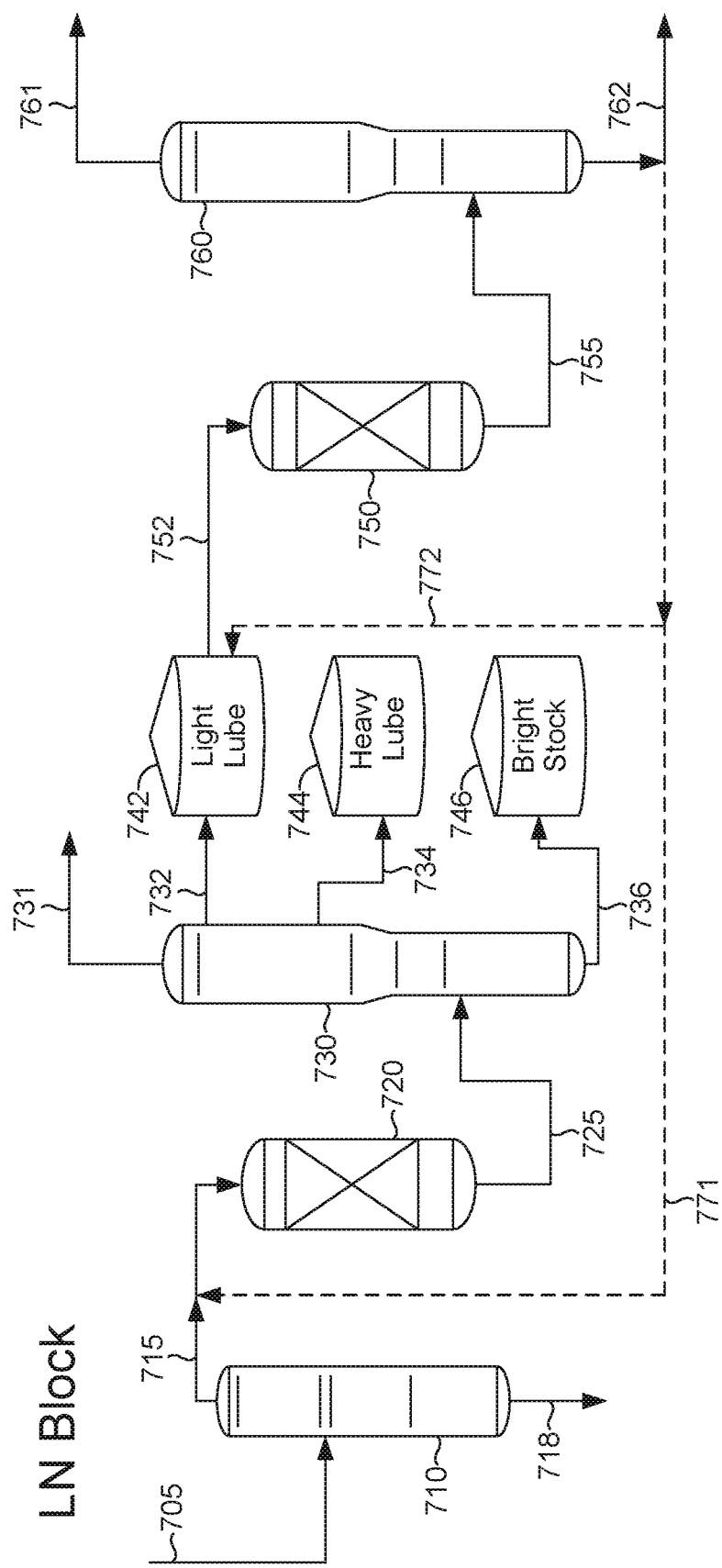
FIG. 4 schematically shows an example of a configuration for block catalytic processing of deasphalted oil to form lubricant base stocks.
Figure 5:
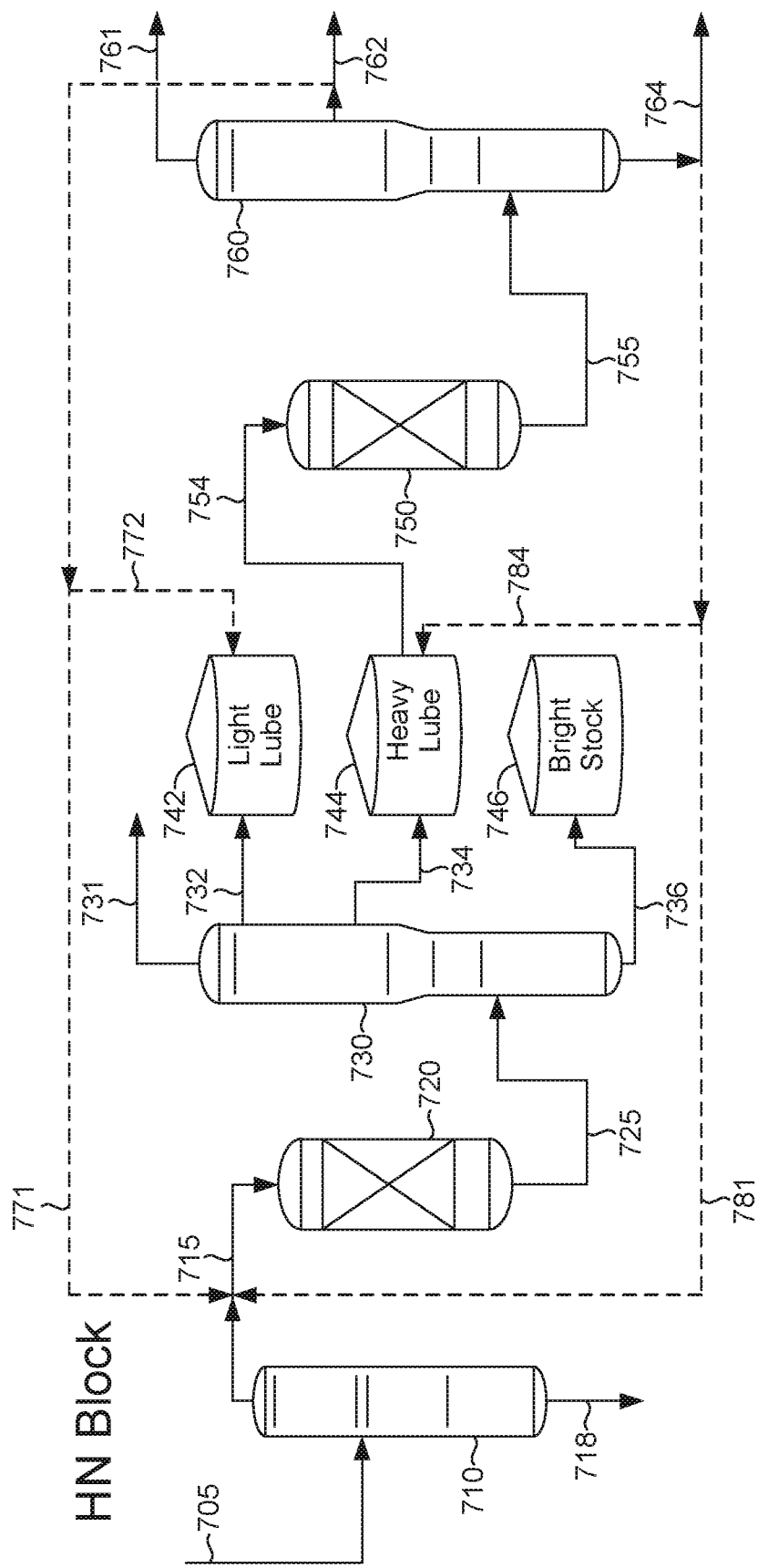
FIG. 5 schematically shows an example of a configuration for block catalytic processing of deasphalted oil to form lubricant base stocks.
Figure 6:
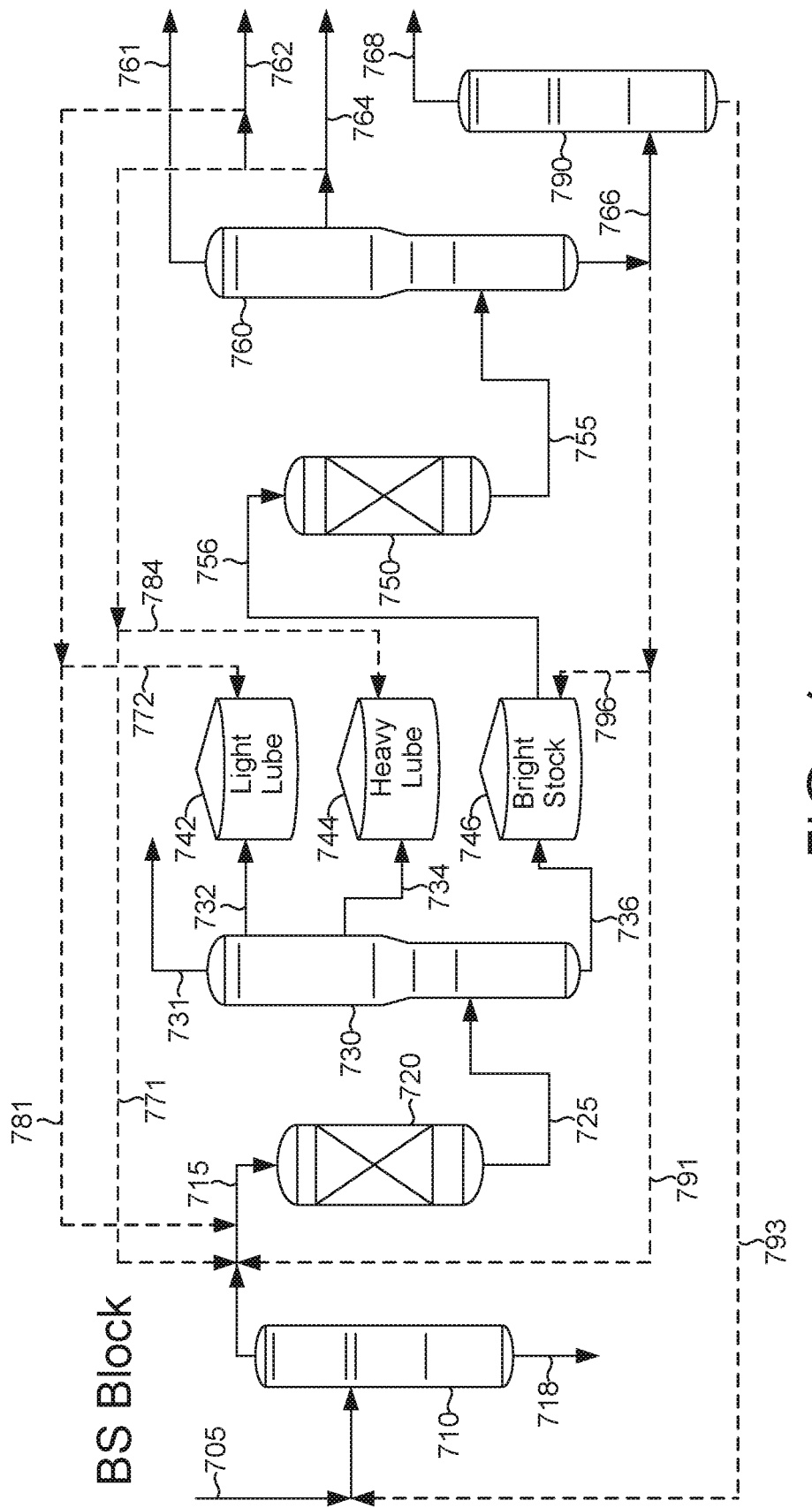
FIG. 6 schematically shows an example of a configuration for block catalytic processing of deasphalted oil to form lubricant base stocks.

FIGS. 4 to 6 show examples of using blocked operation and/or partial product recycle during lubricant production based on a feed including deasphalted resid. In FIGS. 4 to 6, after initial sour stage processing, the hydroprocessed effluent is fractionated to form light neutral, heavy neutral, and brightstock portions. FIG. 4 shows an example of the process flow during processing to form light neutral base stock. FIG. 5 shows an example of the process flow during processing to form heavy neutral base stock. FIG. 6 shows an example of the process flow during processing to form brightstock.

In FIG. 4, a feed 705 is introduced into a deasphalter 710. The deasphalter 710 generates a deasphalted oil 715 and deasphalter rock or residue 718. The deasphalted oil 715 is then processed in a sour processing stage 720. Optionally, a portion 771 of recycled light neutral base product 762 can be combined with deasphalted oil 715. Sour processing stage 720 can include one or more of a deasphalting catalyst, a hydrotreating catalyst, a hydrocracking catalyst, and/or an aromatic saturation catalyst. The conditions in sour processing stage 720 can be selected to at least reduce the sulfur content of the hydroprocessed effluent 725 to 20 wppm or less. This can correspond to 15 wt % to 40 wt % conversion of the feed relative to 370° C. Optionally, the amount of conversion in the sour processing stage 720 can be any convenient higher amount so long as the combined conversion in sour processing stage 720 and sweet processing stage 750 is 90 wt % or less.

The hydroprocessed effluent 725 can then be passed into fractionation stage 730 for separation into a plurality of fractions. In the example shown in FIG. 4, the hydroprocessed effluent is separated into a light neutral portion 732, a heavy neutral portion 734, and a brightstock portion 736. To allow for blocked operation, the light neutral portion 732 can be sent to corresponding light neutral storage 742, the heavy neutral portion 734 can be sent to corresponding heavy neutral storage 744, and the brightstock portion 736 can be sent to corresponding brightstock storage 746. A lower boiling range fraction 731 corresponding to fuels and/or light ends can also be generated by fractionation stage 730. Optionally, fractionation stage can generate a plurality of lower boiling range fractions 731.

FIG. 4 shows an example of the processing system during a light neutral processing block. In FIG. 4, the feed 752 to sweet processing stage 750 corresponds to a feed derived from light neutral storage 742. The sweet processing stage 750 can include at least dewaxing catalyst, and optionally can further include one or more of hydrocracking catalyst and aromatics saturation catalyst. The dewaxed effluent 755 from sweet processing stage 750 can then be passed into a fractionator 760 to form light neutral base stock product 762. A lower boiling fraction 761 corresponding to fuels and/or light ends can also be separated out by fractionator 760. Optionally, a portion of light neutral base stock 762 can be recycled. The recycled portion of light neutral base stock 762 can be used as a recycled feed portion 771 and/or as a recycled portion 772 that is added to light neutral storage 742. Recycling a portion 771 for use as part of the feed can be beneficial for increasing the lifetime of the catalysts in sour processing stage 720. Recycling a portion 772 to light neutral storage 742 can be beneficial for increasing conversion and/or VI.

FIG. 5 shows the same processing configuration during processing of a heavy neutral block. In FIG. 5, the feed 754 to sweet processing stage 750 is derived from heavy neutral storage 744. The dewaxed effluent 755 from sweet processing stage 750 can be fractionated 760 to form lower boiling portion 761, heavy neutral base stock product 764, and light neutral base stock product 762. Because block operation to form a heavy neutral base stock results in production of both a light neutral product 762 and a heavy neutral product 764, various optional recycle streams can also be used. In the example shown in FIG. 5, optional recycle portions 771 and 772 can be used for recycle of the light neutral product 762. Additionally, optional recycle portions 781 and 784 can be used for recycle of the heavy neutral product 764. Recycle portions 781 and 784 can provide similar benefits to those for recycle portions 771 and/or 772.

FIG. 6 shows the same processing configuration during processing of a bright stock block. In FIG. 6, the feed 756 to sweet processing stage 750 is derived from bright stock storage 746. The dewaxed effluent 755 from sweet processing stage 750 can be fractionated 760 to form lower boiling portion 761, bottoms product 766, heavy neutral base stock product 764, and light neutral base stock product 762. Bottoms product 766 can then be extracted 790 to form a bright stock product 768. The aromatic extract 793 produced in extractor 790 can be recycled for use, for example, as part of the feed to deasphalter 710.

Because block operation to form a bright stock results in production of a bright stock product 768 as well as a light neutral product 762 and a heavy neutral product 764, various optional recycle streams can also be used. In the example shown in FIG. 6, optional recycle portions 771 and 772 can be used for recycle of the light neutral product 762, while optional recycle portions 781 and 784 can be used for recycle of the heavy neutral product 764. Additionally, optional recycle portions 791 and 796 can be used for recycle of the bottoms product 766. Recycle portions 791 and 796 can provide similar benefits to those for recycle portions 771, 772, 781, and/or 784.

In various aspects, methods are provided for producing lubricant base stocks from deasphalted oils generated by low severity $C_{4+}$ deasphalting. Low severity deasphalting as used herein refers to deasphalting under conditions that result in a high yield of deasphalted oil (and/or a reduced amount of rejected asphalt or rock), such as a deasphalted oil yield of at least 50 wt % relative to the feed to deasphalting, or at least 55 wt %, or at least 60 wt %, or at least 65 wt %, or at least 70 wt %, or at least 75 wt %.

Conventionally, crude oils are often described as being composed of a variety of boiling ranges. Lower boiling range compounds in a crude oil correspond to naphtha or kerosene fuels. Intermediate boiling range distillate compounds can be used as diesel fuel or as lubricant base stocks. If any higher boiling range compounds are present in a crude oil, such compounds are considered as residual or "resid" compounds, corresponding to the portion of a crude oil that is left over after performing atmospheric and/or vacuum distillation on the crude oil.

In some conventional processing schemes, a resid fraction can be deasphalted, with the deasphalted oil used as part of a feed for forming lubricant base stocks. In conventional processing schemes a deasphalted oil used as feed for forming lubricant base stocks is produced using propane deasphalting. This propane deasphalting corresponds to a "high severity" deasphalting, as indicated by a typical yield of deasphalted oil of about 40 wt % or less, often 30 wt % or less, relative to the initial resid fraction. In a typical lubricant base stock production process, the deasphalted oil can then be solvent extracted to reduce the aromatics content, followed by solvent dewaxing to form a base stock. The low yield of deasphalted oil is based in part on the inability of conventional methods to produce lubricant base stocks from lower severity deasphalting that do not form haze over time.

In some aspects, it has been discovered that catalytic processing can be used to produce lubricant base stocks from deasphalted oil while also producing light neutral and/or heavy neutral base stocks that have little or no tendency to form haze over extended periods of time. The deasphalted oil can be produced by deasphalting process that uses a $C_4$ solvent, a $C_5$ solvent, a $C_{6+}$ solvent, a mixture of two or more $C_{4+}$ solvents, or a mixture of two or more $C_{5+}$ solvents. The deasphalting process can further correspond to a process with a yield of deasphalted oil of at least 50 wt % for a vacuum resid feed having a T10 distillation point (or optionally a T5 distillation point) of at least 510° C., or a yield of at least 60 wt %, or at least 65 wt %, or at least 70 wt %. It is believed that the reduced haze formation is due in part to the reduced or minimized differential between the pour point and the cloud point for the base stocks and/or due in part to forming a bright stock with a cloud point of −5° C. or less.

In some aspects a deasphalted oil can be hydroprocessed (hydrotreated and/or hydrocracked), so that ~700° F.+(370° C.+) conversion is 10 wt % to 40 wt %. The hydroprocessed effluent can be fractionated to separate lower boiling portions from a lubricant base stock boiling range portion. The lubricant boiling range portion can then be hydrocracked, dewaxed, and hydrofinished to produce a catalytically dewaxed effluent. Optionally but preferably, the lubricant boiling range portion can be underdewaxed, so that the wax content of the catalytically dewaxed heavier portion or potential bright stock portion of the effluent is at least 6 wt %, or at least 8 wt %, or at least 10 wt %. This underdewaxing can also be suitable for forming light or medium or heavy neutral lubricant base stocks that do not require further solvent upgrading to form haze free base stocks.

In other aspects a deasphalted oil can be hydroprocessed (hydrotreated and/or hydrocracked), so that 370° C.+ conversion is at least 40 wt %, or at least 50 wt %. The hydroprocessed effluent can be fractionated to separate lower boiling portions from a lubricant base stock boiling range portion. The lubricant base stock boiling range portion can then be hydrocracked, dewaxed, and hydrofinished to produce a catalytically dewaxed effluent.

In still other aspects, it has been discovered that catalytic processing can be used to produce Group II bright stock with unexpected compositional properties from $C_3$, $C_4$, $C_5$, and/or $C_{5+}$ deasphalted oil. The deasphalted oil can be hydrotreated to reduce the content of heteroatoms (such as sulfur and nitrogen), followed by catalytic dewaxing under sweet conditions. Optionally, hydrocracking can be included as part of the sour hydrotreatment stage and/or as part of the sweet dewaxing stage.

The systems and methods described herein can be used in "block" operation to allow for additional improvements in yield and/or product quality. During "block" operation, a deaspahlted oil and/or the hydroprocessed effluent from the sour processing stage can be split into a plurality of fractions. The fractions can correspond, for example, to feed fractions suitable for forming a light neutral fraction, a heavy neutral fraction, and a bright stock fraction, or the plurality of fractions can correspond to any other convenient split into separate fractions. The plurality of separate fractions can then be processed separately in the process train (or in the sweet portion of the process train) for forming lubricant base stocks. For example, the light neutral portion of the feed can be processed for a period of time, followed by processing of the heavy neutral portion, followed by processing of a bright stock portion. During the time period when one type of fraction is being processed, storage tanks can be used to hold the remaining fractions.

Block operation can allow the processing conditions in the process train to be tailored to each type of lubricant fraction. For example, the amount of sweet processing stage conversion of the heavy neutral fraction can be lower than the amount of sweet processing stage conversion for the light neutral fraction. This can reflect the fact that heavy neutral lubricant base stocks may not need as high a viscosity index as light neutral base stocks.

Another option for modifying the production of base stocks can be to recycle a portion of at least one lubricant base stock product for further processing in the process train. This can correspond to recycling a portion of a base stock product for further processing in the sour stage and/or recycling a portion of a base stock product for further processing in the corresponding sweet stage. Optionally, a base stock product can be recycled for further processing in a different phase of block operation, such as recycling light neutral base stock product formed during block processing of the heavy neutral fraction for further processing during block processing of the light neutral fraction. The amount of base stock product recycled can correspond to any convenient amount of a base stock product effluent from the fractionator, such as 1 wt % to 50 wt % of a base stock product effluent, or 1 wt % to 20 wt %.

Recycling a portion of a base stock product effluent can optionally be used while operating a lube processing system at higher than typical levels of fuels conversion. When using a conventional feed for lubricant production, conversion of feed relative to 370° C. can be limited to 65 wt % or less. Conversion of more than 65 wt % of a feed relative to 370° C. is typically not favored due to loss of viscosity index with additional conversion. At elevated levels of conversion, the loss of VI with additional conversion is believed to be due to cracking and/or conversion of isoparaffins within a feed. For feeds derived from deasphalted oil, however, the amount of isoparaffins within a feed is lower than a conventional feed. As a result, additional conversion can be performed without loss of VI. In some aspects, converting at least 70 wt % of a feed, or at least 75 wt %, or at least 80 wt % can allow for production of lubricant base stocks with substantially improved cold flow properties while still maintaining the viscosity index of the products at a similar value to the viscosity index at a conventional conversion of 60 wt %.

In addition to producing base stocks from block processing of deasphalted oils, some base stocks described herein were produced using an alternative configuration. In the alternative configuration, the starting feed was a heavy vacuum gas oil, such as a vacuum gas oil with a T10 distillation point of 482° C. or higher, or 510° C. or higher. The feed was initially extracted using N-methyl pyrollidone. The raffinate from the extraction process was then hydrotreated, catalytically dewaxed, and hydrofinished. The catalysts used for hydrotreating, dewaxing, and hydrofinishing corresponded to commercially available catalysts.

In this discussion, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In this discussion, conditions may be provided for various types of hydroprocessing of feeds or effluents. Examples of hydroprocessing can include, but are not limited to, one or more of hydrotreating, hydrocracking, catalytic dewaxing, and hydrofinishing/aromatic saturation. Such hydroprocessing conditions can be controlled to have desired values for the conditions (e.g., temperature, pressure, LHSV, treat gas rate) by using at least one controller, such as a plurality of controllers, to control one or more of the hydroprocessing conditions. In some aspects, for a given type of hydroprocessing, at least one controller can be associated with each type of hydroprocessing condition. In some aspects, one or more of the hydroprocessing conditions can be controlled by an associated controller. Examples of structures that can be controlled by a controller can include, but are not limited to, valves that control a flow rate, a pressure, or a combination thereof; heat exchangers and/or heaters that control a temperature; and one or more flow meters and one or more associated valves that control relative flow rates of at least two flows. Such controllers can optionally include a controller feedback loop including at least a processor, a detector for detecting a value of a control variable (e.g., temperature, pressure, flow rate, and a processor output for controlling the value of a manipulated variable (e.g., changing the position of a valve, increasing or decreasing the duty cycle and/or temperature for a heater). Optionally, at least one hydroprocessing condition for a given type of hydroprocessing may not have an associated controller.

In various aspects, at least a portion of a feedstock for processing as described herein can correspond to a vacuum resid fraction or another type 950° F.+(510° C.+) or 1000° F.+(538° C.+) fraction. Another example of a method for forming a 950° F.+(510° C.+) or 1000° F.+(538° C.+) fraction is to perform a high temperature flash separation. The 950° F.+(510° C.+) or 1000° F.+(538° C.+) fraction formed from the high temperature flash can be processed in a manner similar to a vacuum resid.

A vacuum resid fraction or a 950° F.+(510° C.+) fraction formed by another process (such as a flash fractionation bottoms or a bitumen fraction) can be deasphalted at low severity to form a deasphalted oil. Optionally, the feedstock can also include a portion of a conventional feed for lubricant base stock production, such as a vacuum gas oil.

A vacuum resid (or other 510° C.+) fraction can correspond to a fraction with a T5 distillation point (ASTM D2892, or ASTM D7169 if the fraction will not completely elute from a chromatographic system) of at least about 900° F. (482° C.), or at least 950° F. (510° C.), or at least 1000° F. (538° C.). Alternatively, a vacuum resid fraction can be characterized based on a T10 distillation point (ASTM D2892/D7169) of at least about 900° F. (482° C.), or at least 950° F. (510° C.), or at least 1000° F. (538° C.).

Resid (or other 510° C.+) fractions can be high in metals. For example, a resid fraction can be high in total nickel, vanadium and iron contents. In an aspect, a resid fraction can contain at least 0.00005 grams of Ni/V/Fe (50 wppm) or at least 0.0002 grams of Ni/V/Fe (200 wppm) per gram of resid, on a total elemental basis of nickel, vanadium and iron. In other aspects, the heavy oil can contain at least 500 wppm of nickel, vanadium, and iron, such as up to 1000 wppm or more.

Contaminants such as nitrogen and sulfur are typically found in resid (or other 510° C.+) fractions, often in organically-bound form. Nitrogen content can range from about 50 wppm to about 10,000 wppm elemental nitrogen or more, based on total weight of the resid fraction. Sulfur content can range from 500 wppm to 100,000 wppm elemental sulfur or more, based on total weight of the resid fraction, or from 1000 wppm to 50,000 wppm, or from 1000 wppm to 30,000 wppm.

Still another method for characterizing a resid (or other 510° C.+) fraction is based on the Conradson carbon residue (CCR) of the feedstock. The Conradson carbon residue of a resid fraction can be at least about 5 wt %, such as at least about 10 wt % or at least about 20 wt %. Additionally or alternately, the Conradson carbon residue of a resid fraction can be about 50 wt % or less, such as about 40 wt % or less or about 30 wt % or less.

In some aspects, a vacuum gas oil fraction can be co-processed with a deasphalted oil. The vacuum gas oil can be combined with the deasphalted oil in various amounts ranging from 20 parts (by weight) deasphalted oil to 1 part vacuum gas oil (i.e., 20:1) to 1 part deasphalted oil to 1 part vacuum gas oil. In some aspects, the ratio of deasphalted oil to vacuum gas oil can be at least 1:1 by weight, or at least 1.5:1, or at least 2:1. Typical (vacuum) gas oil fractions can include, for example, fractions with a T5 distillation point to T95 distillation point of 650° F. (343° C.)-1050° F. (566° C.) or 650° F. (343° C.)-1000° F. (538° C.) or 650° F. (343° C.)-950° F. (510° C.) or 650° F. (343° C.)-900° F. (482° C.) or ~700° F. (370° C.)-1050° F. (566° C.) or ~700° F. (370° C.)-1000° F. (538° C.) or ~700° F. (370° C.)-950° F. (510° C.) or ~700° F. (370° C.)- 900° F. (482° C.), or 750° F. (399° C.)-1050° F. (566° C.), or 750° F. (399° C.)-1000° F. (538° C.), or 750° F. (399° C.)-950° F. (510° C.), or 750° F. (399° C.)-900° F. (482° C.). For example a suitable vacuum gas oil fraction can have a T5 distillation point of at least 343° C. and a T95 distillation point of 566° C. or less; or a T10 distillation point of at least 343° C. and a T90 distillation point of 566° C. or less; or a T5 distillation point of at least 370° C. and a T95 distillation point of 566° C. or less; or a T5 distillation point of at least 343° C. and a T95 distillation point of 538° C. or less.

Solvent Deasphalting

Solvent deasphalting is a solvent extraction process. In some aspects, suitable solvents for methods as described herein include alkanes or other hydrocarbons (such as alkenes) containing 4 to 7 carbons per molecule. Examples of suitable solvents include n-butane, isobutane, n-pentane, $C_{4+}$ alkanes, $C_{5+}$ alkanes, $C_{4+}$ hydrocarbons, and $C_{5+}$ hydrocarbons. In other aspects, suitable solvents can include $C_3$ hydrocarbons, such as propane. In such other aspects, examples of suitable solvents include propane, n-butane, isobutane, n-pentane, $C_{3+}$ alkanes, $C_{4+}$ alkanes, $C_{5+}$ alkanes, $C_{3+}$ hydrocarbons, $C_{4+}$ hydrocarbons, and $C_{5+}$ hydrocarbons.

In this discussion, a solvent comprising $C_n$ (hydrocarbons) is defined as a solvent composed of at least 80 wt % of alkanes (hydrocarbons) having n carbon atoms, or at least 85 wt %, or at least 90 wt %, or at least 95 wt %, or at least 98 wt %. Similarly, a solvent comprising $C_{n+}$ (hydrocarbons) is defined as a solvent composed of at least 80 wt % of alkanes (hydrocarbons) having n or more carbon atoms, or at least 85 wt %, or at least 90 wt %, or at least 95 wt %, or at least 98 wt %.

In this discussion, a solvent comprising $C_n$ alkanes (hydrocarbons) is defined to include the situation where the solvent corresponds to a single alkane (hydrocarbon) containing n carbon atoms (for example, n=3, 4, 5, 6, 7) as well as the situations where the solvent is composed of a mixture of alkanes (hydrocarbons) containing n carbon atoms. Similarly, a solvent comprising $C_{n+}$ alkanes (hydrocarbons) is defined to include the situation where the solvent corresponds to a single alkane (hydrocarbon) containing n or more carbon atoms (for example, n=3, 4, 5, 6, 7) as well as the situations where the solvent corresponds to a mixture of alkanes (hydrocarbons) containing n or more carbon atoms. Thus, a solvent comprising $C_{4+}$ alkanes can correspond to a solvent including n-butane; a solvent include n-butane and isobutane; a solvent corresponding to a mixture of one or more butane isomers and one or more pentane isomers; or any other convenient combination of alkanes containing 4 or more carbon atoms. Similarly, a solvent comprising $C_{5+}$ alkanes (hydrocarbons) is defined to include a solvent corresponding to a single alkane (hydrocarbon) or a solvent corresponding to a mixture of alkanes (hydrocarbons) that contain 5 or more carbon atoms. Alternatively, other types of solvents may also be suitable, such as supercritical fluids. In various aspects, the solvent for solvent deasphalting can consist essentially of hydrocarbons, so that at least 98 wt % or at least 99 wt % of the solvent corresponds to compounds containing only carbon and hydrogen. In aspects where the deasphalting solvent corresponds to a $C_{4+}$ deasphalting solvent, the $C_{4+}$ deasphalting solvent can include less than 15 wt % propane and/or other $C_3$ hydrocarbons, or less than 10 wt %, or less than 5 wt %, or the $C_{4+}$ deasphalting solvent can be substantially free of propane and/or other $C_3$ hydrocarbons (less than 1 wt %). In aspects where the deasphalting solvent corresponds to a $C_{5+}$ deasphalting solvent, the $C_{5+}$ deasphalting solvent can include less than 15 wt % propane, butane and/or other $C_3$-$C_4$ hydrocarbons, or less than 10 wt %, or less than 5 wt %, or the $C_{5+}$ deasphalting solvent can be substantially free of propane, butane, and/or other $C_3$-$C_4$ hydrocarbons (less than 1 wt %). In aspects where the deasphalting solvent corresponds to a $C_{3+}$ deasphalting solvent, the $C_{3+}$ deasphalting solvent can include less than 10 wt % ethane and/or other $C_2$ hydrocarbons, or less than 5 wt %, or the $C_{3+}$ deasphalting solvent can be substantially free of ethane and/or other $C_2$ hydrocarbons (less than 1 wt %).

Deasphalting of heavy hydrocarbons, such as vacuum resids, is known in the art and practiced commercially. A deasphalting process typically corresponds to contacting a heavy hydrocarbon with an alkane solvent (propane, butane, pentane, hexane, heptane etc and their isomers), either in pure form or as mixtures, to produce two types of product streams. One type of product stream can be a deasphalted oil extracted by the alkane, which is further separated to produce deasphalted oil stream. A second type of product stream can be a residual portion of the feed not soluble in the solvent, often referred to as rock or asphaltene fraction. The deasphalted oil fraction can be further processed into make fuels or lubricants. The rock fraction can be further used as blend component to produce asphalt, fuel oil, and/or other products. The rock fraction can also be used as feed to gasification processes such as partial oxidation, fluid bed combustion or coking processes. The rock can be delivered to these processes as a liquid (with or without additional components) or solid (either as pellets or lumps).

During solvent deasphalting, a resid boiling range feed (optionally also including a portion of a vacuum gas oil feed) can be mixed with a solvent. Portions of the feed that are soluble in the solvent are then extracted, leaving behind a residue with little or no solubility in the solvent. The portion of the deasphalted feedstock that is extracted with the solvent is often referred to as deasphalted oil. Typical solvent deasphalting conditions include mixing a feedstock fraction with a solvent in a weight ratio of from about 1:2 to about 1:10, such as about 1:8 or less. Typical solvent deasphalting temperatures range from 40° C. to 200° C., or 40° C. to 150° C., depending on the nature of the feed and the solvent. The pressure during solvent deasphalting can be from about 50 psig (345 kPag) to about 500 psig (3447 kPag).

It is noted that the above solvent deasphalting conditions represent a general range, and the conditions will vary depending on the feed. For example, under typical deasphalting conditions, increasing the temperature can tend to reduce the yield while increasing the quality of the resulting deasphalted oil. Under typical deasphalting conditions, increasing the molecular weight of the solvent can tend to increase the yield while reducing the quality of the resulting deasphalted oil, as additional compounds within a resid fraction may be soluble in a solvent composed of higher molecular weight hydrocarbons. Under typical deasphalting conditions, increasing the amount of solvent can tend to increase the yield of the resulting deasphalted oil. As understood by those of skill in the art, the conditions for a particular feed can be selected based on the resulting yield of deasphalted oil from solvent deasphalting. In aspects where a $C_3$ deasphalting solvent is used, the yield from solvent deasphalting can be 40 wt % or less. In some aspects, $C_4$ deasphalting can be performed with a yield of deasphalted oil of 50 wt % or less, or 40 wt % or less. In various aspects, the yield of deasphalted oil from solvent deasphalting with a $C_{4+}$ solvent can be at least 50 wt % relative to the weight of the feed to deasphalting, or at least 55 wt %, or at least 60 wt % or at least 65 wt %, or at least 70 wt %. In aspects where the feed to deasphalting includes a vacuum gas oil portion, the yield from solvent deasphalting can be characterized based on a yield by weight of a 950° F.+(510° C.) portion of the deasphalted oil relative to the weight of a 510° C.+ portion of the feed. In such aspects where a $C_{4+}$ solvent is used, the yield of 510° C.+ deasphalted oil from solvent deasphalting can be at least 40 wt % relative to the weight of the 510° C.+ portion of the feed to deasphalting, or at least 50 wt %, or at least 55 wt %, or at least 60 wt % or at least 65 wt %, or at least 70 wt %. In such aspects where a $C_{4-}$ solvent is used, the yield of 510° C.+ deasphalted oil from solvent deasphalting can be 50 wt % or less relative to the weight of the 510° C.+ portion of the feed to deasphalting, or 40 wt % or less, or 35 wt % or less.

Hydrotreating and Hydrocracking

After deasphalting, the deasphalted oil (and any additional fractions combined with the deasphalted oil) can undergo further processing to form lubricant base stocks. This can include hydrotreatment and/or hydrocracking to remove heteroatoms to desired levels, reduce Conradson Carbon content, and/or provide viscosity index (VI) uplift. Depending on the aspect, a deasphalted oil can be hydroprocessed by hydrotreating, hydrocracking, or hydrotreating and hydrocracking. Optionally, one or more catalyst beds and/or stages of demetallization catalyst can be included prior to the initial bed of hydrotreating and/or hydrocracking catalyst. Optionally, the hydroprocessing can further include exposing the deasphalted oil to a base metal aromatic saturation catalyst. It is noted that a base metal aromatic saturation catalyst can sometimes be similar to a lower activity hydrotreating catalyst.

The deasphalted oil can be hydrotreated and/or hydrocracked with little or no solvent extraction being performed prior to and/or after the deasphalting. As a result, the deasphalted oil feed for hydrotreatment and/or hydrocracking can have a substantial aromatics content. In various aspects, the aromatics content of the deasphalted oil feed can be at least 50 wt %, or at least 55 wt %, or at least 60 wt %, or at least 65 wt %, or at least 70 wt %, or at least 75 wt %, such as up to 90 wt % or more. Additionally or alternately, the saturates content of the deasphalted oil feed can be 50 wt % or less, or 45 wt % or less, or 40 wt % or less, or 35 wt % or less, or 30 wt % or less, or 25 wt % or less, such as down to 10 wt % or less. In this discussion and the claims below, the aromatics content and/or the saturates content of a fraction can be determined based on ASTM D7419.

The reaction conditions during demetallization and/or hydrotreatment and/or hydrocracking of the deasphalted oil (and optional vacuum gas oil co-feed) can be selected to generate a desired level of conversion of a feed. Any convenient type of reactor, such as fixed bed (for example trickle bed) reactors can be used. Conversion of the feed can be defined in terms of conversion of molecules that boil above a temperature threshold to molecules below that threshold. The conversion temperature can be any convenient temperature, such as ~700° F. (370° C.) or 1050° F. (566° C.). The amount of conversion can correspond to the total conversion of molecules within the combined hydrotreatment and hydrocracking stages for the deasphalted oil. Suitable amounts of conversion of molecules boiling above 1050° F. (566° C.) to molecules boiling below 566° C. include 30 wt % to 90 wt % conversion relative to 566° C., or 30 wt % to 80 wt %, or 30 wt % to 70 wt %, or 40 wt % to 90 wt %, or 40 wt % to 80 wt %, or 40 wt % to 70 wt %, or 50 wt % to 90 wt %, or 50 wt % to 80 wt %, or 50 wt % to 70 wt %. In particular, the amount of conversion relative to 566° C. can be 30 wt % to 90 wt %, or 30 wt % to 70 wt %, or 50 wt % to 90 wt %. Additionally or alternately, suitable amounts of conversion of molecules boiling above ~700° F. (370° C.) to molecules boiling below 370° C. include 10 wt % to 70 wt % conversion relative to 370° C., or 10 wt % to 60 wt %, or 10 wt % to 50 wt %, or 20 wt % to 70 wt %, or 20 wt % to 60 wt %, or 20 wt % to 50 wt %, or 30 wt % to 70 wt %, or 30 wt % to 60 wt %, or 30 wt % to 50 wt %. In particular, the amount of conversion relative to 370° C. can be 10 wt % to 70 wt %, or 20 wt % to 50 wt %, or 30 wt % to 60 wt %.

The hydroprocessed deasphalted oil can also be characterized based on the product quality. After hydroprocessing (hydrotreating and/or hydrocracking), the hydroprocessed deasphalted oil can have a sulfur content of 200 wppm or less, or 100 wppm or less, or 50 wppm or less (such as down to ~0 wppm). Additionally or alternately, the hydroprocessed deasphalted oil can have a nitrogen content of 200 wppm or less, or 100 wppm or less, or 50 wppm or less (such as down to ~0 wppm). Additionally or alternately, the hydroprocessed deasphalted oil can have a Conradson Carbon residue content of 1.5 wt % or less, or 1.0 wt % or less, or 0.7 wt % or less, or 0.1 wt % or 0.02 wt % or less (such as down to ~0 wt %). Conradson Carbon residue content can be determined according to ASTM D4530.

In various aspects, a feed can initially be exposed to a demetallization catalyst prior to exposing the feed to a hydrotreating catalyst. Deasphalted oils can have metals concentrations (Ni+V+Fe) on the order of 10-100 wppm. Exposing a conventional hydrotreating catalyst to a feed having a metals content of 10 wppm or more can lead to catalyst deactivation at a faster rate than may desirable in a commercial setting. Exposing a metal containing feed to a demetallization catalyst prior to the hydrotreating catalyst can allow at least a portion of the metals to be removed by the demetallization catalyst, which can reduce or minimize the deactivation of the hydrotreating catalyst and/or other subsequent catalysts in the process flow. Commercially available demetallization catalysts can be suitable, such as large pore amorphous oxide catalysts that may optionally include Group VI and/or Group VIII non-noble metals to provide some hydrogenation activity.

In various aspects, the deasphalted oil can be exposed to a hydrotreating catalyst under effective hydrotreating conditions. The catalysts used can include conventional hydroprocessing catalysts, such as those comprising at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. More generally, any convenient size, shape, and/or pore size distribution for a catalyst suitable for hydrotreatment of a distillate (including lubricant base stock) boiling range feed in a conventional manner may be used. Preferably, the support or carrier material is an amorphous support, such as a refractory oxide. Preferably, the support or carrier material can be free or substantially free of the presence of molecular sieve, where substantially free of molecular sieve is defined as having a content of molecular sieve of less than about 0.01 wt %.

The at least one Group VIII non-noble metal, in oxide form, can typically be present in an amount ranging from about 2 wt % to about 40 wt %, preferably from about 4 wt % to about 15 wt %. The at least one Group VI metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane). The treat gas stream introduced into a reaction stage will preferably contain at least about 50 vol. % and more preferably at least about 75 vol. % hydrogen. Optionally, the hydrogen treat gas can be substantially free (less than 1 vol %) of impurities such as H$_2$S and NH$_3$ and/or such impurities can be substantially removed from a treat gas prior to use.

Hydrogen can be supplied at a rate of from about 100 SCF/B (standard cubic feet of hydrogen per barrel of feed) (17 Nm$^3$/m$^3$) to about 10000 SCF/B (1700 Nm$^3$/m$^3$). Preferably, the hydrogen is provided in a range of from about 200 SCF/B (34 Nm$^3$/m$^3$) to about 2500 SCF/B (420 Nm$^3$/m$^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 hr$^{-1}$ to 10 hr$^{-1}$; and hydrogen treat rates of 200 scf/B (35.6 m$^3$/m$^3$) to 10,000 scf/B (1781 m$^3$/m$^3$), or 500 (89 m$^3$/m$^3$) to 10,000 scf/B (1781 m$^3$/m$^3$).

In various aspects, the deasphalted oil can be exposed to a hydrocracking catalyst under effective hydrocracking conditions. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.30 Angstroms or less. Additionally or alternately, the catalyst can be a low acidity molecular sieve, such as a USY zeolite with a Si to Al ratio of at least about 20, and preferably at least about 40 or 50. ZSM-48, such as ZSM-48 with a SiO2 to Al$_2$O$_3$ ratio of about 110 or less, such as about 90 or less, is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

When only one hydrogenation metal is present on a hydrocracking catalyst, the amount of that hydrogenation metal can be at least about 0.1 wt % based on the total weight of the catalyst, for example at least about 0.5 wt % or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternately when more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternately when more than one hydrogenation metal is present, the collective amount of hydrogenation metals can be about 35 wt % or less based on the total weight of the catalyst, for example about 30 wt % or less, about 25 wt % or less, about 20 wt % or less, about 15 wt % or less, about 10 wt % or less, or about 5 wt % or less. In embodiments wherein the supported metal comprises a noble metal, the amount of noble metal(s) is typically less than about 2 wt %, for example less than about 1 wt %, about 0.9 wt % or less, about 0.75 wt % or less, or about 0.6 wt % or less. It is noted that hydrocracking under sour conditions is typically performed using a base metal (or metals) as the hydrogenation metal.

In various aspects, the conditions selected for hydrocracking for lubricant base stock production can depend on the desired level of conversion, the level of contaminants in the input feed to the hydrocracking stage, and potentially other factors. For example, hydrocracking conditions in a single stage, or in the first stage and/or the second stage of a multi-stage system, can be selected to achieve a desired level of conversion in the reaction system. Hydrocracking conditions can be referred to as sour conditions or sweet conditions, depending on the level of sulfur and/or nitrogen present within a feed. For example, a feed with 100 wppm or less of sulfur and 50 wppm or less of nitrogen, preferably less than 25 wppm sulfur and/or less than 10 wppm of nitrogen, represent a feed for hydrocracking under sweet conditions. In various aspects, hydrocracking can be performed on a thermally cracked resid, such as a deasphalted oil derived from a thermally cracked resid. In some aspects, such as aspects where an optional hydrotreating step is used prior to hydrocracking, the thermally cracked resid may correspond to a sweet feed. In other aspects, the thermally cracked resid may represent a feed for hydrocracking under sour conditions.

A hydrocracking process under sour conditions can be carried out at temperatures of about 550° F. (288° C.) to about 840° F. (449° C.), hydrogen partial pressures of from about 1500 psig to about 5000 psig (10.3 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 to about 50 h$^{-1}$, or from about 0.5 to about 20 h$^{-1}$, preferably from about 1.0 to about 4.0 h$^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as about 350° F. (177° C.) or about 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (177° C.) or at least about 400° F. (204° C.) to having an upper end cut point temperature of about 700° F. (371° C.) or less or 650° F. (343° C.) or less. Optionally, the distillate fuel range can be extended to include additional kerosene, such as by selecting a lower end cut point temperature of at least about 300° F. (149° C.).

In aspects where the inter-stage separator is also used to produce a distillate fuel fraction, the portion boiling below the distillate fuel fraction includes, naphtha boiling range molecules, light ends, and contaminants such as H$_2$S. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel range is subjected to further hydroprocessing in a second hydroprocessing stage.

A hydrocracking process under sweet conditions can be performed under conditions similar to those used for a sour hydrocracking process, or the conditions can be different. In an embodiment, the conditions in a sweet hydrocracking stage can have less severe conditions than a hydrocracking process in a sour stage. Suitable hydrocracking conditions for a non-sour stage can include, but are not limited to, conditions similar to a first or sour stage. Suitable hydrocracking conditions can include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, preferably from about 1.0 h$^{-1}$ to about 4.0 h$^{-1}$.

In still another aspect, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In yet another aspect, a hydroprocessing reaction system may include more than one hydrocracking stage. If multiple hydrocracking stages are present, at least one hydrocracking stage can have effective hydrocracking conditions as described above, including a hydrogen partial pressure of at least about 1500 psig (10.3 MPag). In such an aspect, other hydrocracking processes can be performed under conditions that may include lower hydrogen partial pressures. Suitable hydrocracking conditions for an additional hydrocracking stage can include, but are not limited to, temperatures of about 500° F. (260° C.) to about 840° F. (449° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions for an additional hydrocracking stage can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, and preferably from about 1.0 h$^{-1}$ to about 4.0 h$^{-1}$.

Additional Hydroprocessing—Catalytic Dewaxing, Hydrofinishing, and Optional Hydrocracking At least a lubricant boiling range portion of the hydroprocessed deasphalted oil can be exposed to further hydroprocessing (including catalytic dewaxing) to form base stocks, including light neutral and heavy neutral base stocks as well as Group I and/or Group II bright stock. In some aspects, a first lubricant boiling range portion of the hydroprocessed deasphalted oil can be solvent dewaxed as described above while a second lubricant boiling range portion can be exposed to further hydroprocessing. In other aspects, only solvent dewaxing or only further hydroprocessing can be used to treat a lubricant boiling range portion of the hydroprocessed deasphalted oil.

Optionally, the further hydroprocessing of the lubricant boiling range portion of the hydroprocessed deasphalted oil can also include exposure to hydrocracking conditions before and/or after the exposure to the catalytic dewaxing conditions. At this point in the process, the hydrocracking can be considered "sweet" hydrocracking, as the hydroprocessed deasphalted oil can have a sulfur content of 200 wppm or less.

Suitable hydrocracking conditions can include exposing the feed to a hydrocracking catalyst as previously described above. Optionally, it can be preferable to use a USY zeolite with a silica to alumina ratio of at least 30 and a unit cell size of less than 24.32 Angstroms as the zeolite for the hydrocracking catalyst, in order to improve the VI uplift from hydrocracking and/or to improve the ratio of distillate fuel yield to naphtha fuel yield in the fuels boiling range product.

Suitable hydrocracking conditions can also include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, and preferably from about 1.0 h$^{-1}$ to about 4.0 h$^{-1}$.

For catalytic dewaxing, suitable dewaxing catalysts can include molecular sieves such as crystalline aluminosilicates (zeolites). In an embodiment, the molecular sieve can comprise, consist essentially of, or be ZSM-22, ZSM-23, ZSM-48. Optionally but preferably, molecular sieves that are selective for dewaxing by isomerization as opposed to cracking can be used, such as ZSM-48, ZSM-23, or a combination thereof. Additionally or alternately, the molecular sieve can comprise, consist essentially of, or be a 10-member ring 1-D molecular sieve, such as EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the invention are catalysts with a low ratio of silica to alumina. For example, for ZSM-48, the ratio of silica to alumina in the zeolite can be about 100:1 or less, such as about 90:1 or less, or about 75:1 or less, or about 70:1 or less. Additionally or alternately, the ratio of silica to alumina in the ZSM-48 can be at least about 50:1, such as at least about 60:1, or at least about 65:1.

In various embodiments, the catalysts according to the invention further include a metal hydrogenation component. The metal hydrogenation component is typically a Group VI and/or a Group VIII metal. Preferably, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.5 wt %, or at least 1.0 wt %, or at least 2.5 wt %, or at least 5.0 wt %, based on catalyst. The amount of metal in the catalyst can be 20 wt % or less based on catalyst, or 10 wt % or less, or 5 wt % or less, or 2.5 wt % or less, or 1 wt % or less. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the invention can also include a binder. In some embodiments, the dewaxing catalysts used in process according to the invention are formulated using a low surface area binder, a low surface area binder represents a binder with a surface area of 100 m$^2$/g or less, or 80 m$^2$/g or less, or 70 m$^2$/g or less. Additionally or alternately, the binder can have a surface area of at least about 25 m$^2$/g. The amount of zeolite in a catalyst formulated using a binder can be from about 30 wt % zeolite to 90 wt % zeolite relative to the combined weight of binder and zeolite. Preferably, the amount of zeolite is at least about 50 wt % of the combined weight of zeolite and binder, such as at least about 60 wt % or from about 65 wt % to about 80 wt %.

Without being bound by any particular theory, it is believed that use of a low surface area binder reduces the amount of binder surface area available for the hydrogenation metals supported on the catalyst. This leads to an increase in the amount of hydrogenation metals that are supported within the pores of the molecular sieve in the catalyst.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Effective conditions for catalytic dewaxing of a feedstock in the presence of a dewaxing catalyst can include a temperature of from 280° C. to 450° C., preferably 343° C. to 435° C., a hydrogen partial pressure of from 3.5 MPag to 34.6 MPag (500 psig to 5000 psig), preferably 4.8 MPag to 20.8 MPag, and a hydrogen circulation rate of from 178 m$^3$/m$^3$ (1000 SCF/B) to 1781 m$^3$/m$^3$ (10,000 scf/B), preferably 213 m$^3$/m$^3$ (1200 SCF/B) to 1068 m$^3$/m$^3$ (6000 SCF/B). The LHSV can be from about 0.2 h$^1$ to about 10 h$^1$, such as from about 0.5 h$^1$ to about 5 h$^1$ and/or from about 1 h$^{-1}$ to about 4 h$^{-1}$.

Before and/or after catalytic dewaxing, the hydroprocessed deasphalted oil (i.e., at least a lubricant boiling range portion thereof) can optionally be exposed to an aromatic saturation catalyst, which can alternatively be referred to as a hydrofinishing catalyst. Exposure to the aromatic saturation catalyst can occur either before or after fractionation. If aromatic saturation occurs after fractionation, the aromatic saturation can be performed on one or more portions of the fractionated product. Alternatively, the entire effluent from the last hydrocracking or dewaxing process can be hydrofinished and/or undergo aromatic saturation.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt. % or greater based on catalyst. For supported hydrotreating catalysts, suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41.

Hydrofinishing conditions can include temperatures from about 125° C. to about 425° C., preferably about 180° C. to about 280° C., a hydrogen partial pressure from about 500 psig (3.4 MPa) to about 3000 psig (20.7 MPa), preferably about 1500 psig (10.3 MPa) to about 2500 psig (17.2 MPa), and liquid hourly space velocity from about 0.1 hr$^1$ to about 5 hr$^{-1}$ LHSV, preferably about 0.5 hr$^{-1}$ to about 1.5 hr$^{-1}$. Additionally, a hydrogen treat gas rate of from 35.6 m$^3$/m$^3$ to 1781 m$^3$/m$^3$ (200 SCF/B to 10,000 SCF/B) can be used.

Lubricating Oil Additives

A formulated lubricating oil useful in the present disclosure may contain one or more of the other commonly used lubricating oil performance additives including but not limited to antiwear additives, detergents, dispersants, viscosity modifiers, corrosion inhibitors, rust inhibitors, metal deactivators, extreme pressure additives, anti-seizure agents, wax modifiers, other viscosity modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see "Lubricant Additives, Chemistry and Applications", Ed. L. R. Rudnick, Marcel Dekker, Inc. 270 Madison Ave. New York, N.J. 10016, 2003, and Klamann in Lubricants and Related Products, Verlag Chemie, Deerfield Beach, Fla.; ISBN 0-89573-177-0. Reference is also made to "Lubricant Additives" by M. W. Ranney, published by Noyes Data Corporation of Parkridge, N J (1973); see also U.S. Pat. No. 7,704,930, the disclosure of which is incorporated herein in its entirety. These additives are commonly delivered with varying amounts of diluent oil that may range from 5 weight percent to 50 weight percent.

The additives useful in this disclosure do not have to be soluble in the lubricating oils. Insoluble additives such as zinc stearate in oil can be dispersed in the lubricating oils of this disclosure.

When lubricating oil compositions contain one or more additives, the additive(s) are blended into the composition in an amount sufficient for it to perform its intended function. Additives are typically present in lubricating oil compositions as a minor component, typically in an amount of less than 50 weight percent, preferably less than about 30 weight percent, and more preferably less than about 15 weight percent, based on the total weight of the composition. Additives are most often added to lubricating oil compositions in an amount of at least 0.1 weight percent, preferably at least 1 weight percent, more preferably at least 5 weight percent. Typical amounts of such additives useful in the present disclosure are shown in Table 1 below.

It is noted that many of the additives are shipped from the additive manufacturer as a concentrate, containing one or more additives together, with a certain amount of base oil diluents. Accordingly, the weight amounts in the Table 1 below, as well as other amounts mentioned herein, are directed to the amount of active ingredient (that is the non-diluent portion of the ingredient). The weight percent (wt %) indicated below is based on the total weight of the lubricating oil composition.

TABLE 1

Typical Amounts of Other Lubricating Oil Components

| Compound | Approximate wt % (Useful) | Approximate wt % (Preferred) |
|---|---|---|
| Dispersant | 0.1-20 | 0.1-8 |
| Detergent | 0.1-20 | 0.1-8 |
| Friction Modifier | 0.01-5 | 0.01-1.5 |
| Antioxidant | 0.1-5 | 0.1-1.5 |
| Pour Point Depressant (PPD) | 0.0-5 | 0.01-1.5 |
| Anti-foam Agent | 0.001-3 | 0.001-0.15 |
| Viscosity Modifier (solid polymer basis) | 0.1-2 | 0.1-1 |
| Antiwear | 0.2-3 | 0.5-1 |
| Inhibitor and Antirust | 0.01-5 | 0.01-1.5 |

The foregoing additives are all commercially available materials. These additives may be added independently but are usually precombined in packages which can be obtained from suppliers of lubricant oil additives. Additive packages with a variety of ingredients, proportions and characteristics are available and selection of the appropriate package will take the requisite use of the ultimate composition into account.

The lube base stocks of the present disclosure are well suited as lube base stocks without blending limitations, and further, the lube base stock products are also compatible with lubricant additives for lubricant formulations. The lube base stocks of the present disclosure can optionally be blended with other lube base stocks to form lubricants. Useful cobase lube stocks include Group I, III, IV and V base stocks and gas-to-liquid (GTL) oils. One or more of the cobase stocks may be blended into a lubricant composition including the lube base stock at from 0.1 to 50 wt. %, or 0.5 to 40 wt. %, 1 to 35 wt. %, or 2 to 30 wt. %, or 5 to 25 wt. %, or 10 to 20 wt. %, based on the total lubricant composition.

The lube base stocks and lubricant compositions can be employed in the present disclosure in a variety of lubricant-related end uses, such as a lubricant oil or grease for a device or apparatus requiring lubrication of moving and/or interacting mechanical parts, components, or surfaces. Useful apparatuses include engines and machines. The lube base stocks of the present disclosure are most suitable for use in the formulation of automotive crank case lubricants, automotive gear oils, transmission oils, many industrial lubricants including circulation lubricant, industrial gear lubricants, grease, compressor oil, pump oils, refrigeration lubricants, hydraulic lubricants, metal working fluids.

The following non-limiting examples are provided to illustrate the disclosure.

EXAMPLES

Base stocks having unexpected compositions were produced using two reaction configurations. In a first configuration, light neutral and heavy neutral base stocks were processed using a two-stage processing configuration with block operation in a configuration similar to the configuration shown in FIG. 4. In the first configuration, a high yield deasphalted oil is processed in a first sour stage by exposing the feed to a demetallization catalyst, a hydrotreatment catalyst, and a hydrocracking catalyst. The lubricant boiling range portion (and higher) of the effluent is then processed in a second sweet stage using block operation to allow for separate processing conditions for the light neutral and heavy neutral base stocks. In the first configuration, the blocked feeds (such as a light neutral feed, heavy neutral feed, or bright stock feed) were then passed into the second stage and exposed to an aromatic saturation catalyst, a hydrocracking catalyst, a dewaxing catalyst, and another portion of the aromatic saturation catalyst. This resulted in production of light neutral base stock, heavy neutral base stock, and bright stock, according to the nature of the blocked feed. The aromatic saturation catalyst was a commercially available aromatic saturation catalyst including Pt on a mixed metal oxide. The dewaxing catalyst was a catalyst that dewaxes primarily by isomerization, and also included supported Pt. The hydrocracking catalyst included Pt on a support including USY.

In addition to the primary lubricant product based on the nature of the blocked feed, processing of the bright stock in the second stage also resulted in production of additional light neutral and heavy neutral base stocks. The additional light neutral and heavy neutral base stocks were generated due to the additional conversion occurring in the second stage. The composition of additional heavy neutral base stocks is separately reported in FIG. 2 as inventive base stocks 3 and 4. The composition of an additional light neutral base stock is separately reported in FIG. 3 as inventive base stock 3.

In the second configuration, a heavy vacuum gas oil feed was solvent extracted using N-methyl pyrollidone. The resulting solvent extracted feed was then hydrotreated, dewaxed, and hydrofinished to form heavy neutral base stocks.

For inventive base stocks 1, 4, 5, and 6 in FIG. 2 and inventive base stocks 1, 2, and 3 in FIG. 3, the hydrocracking catalyst for processing of the feed was based on USY zeolite and included supported Pt. For inventive base stocks 2 and 3 in FIG. 2 and inventive base stock 4 in FIG. 3, the hydrocracking catalyst was based on zeolite Beta and included supported Pt. For all of the inventive base stocks, the demetallization catalyst, hydrotreating catalyst, and aromatic saturation catalyst corresponded to commercially available catalysts. The dewaxing catalyst corresponded to Pt supported on a bound zeolite that dewaxes primarily by isomerization.

The lubricating oil base stock compositions were determined using a combination of advanced analytical techniques including gas chromatography mass spectrometry (GCMS), supercritical fluid chromatography (SFC), carbon-13 nuclear magnetic resonance ($^{13}$C-NMR), proton nuclear magnetic resonance (proton-NMR), and differential scanning calorimetry (DSC). Examples of low viscosity lubricating oil base stocks of this disclosure and having a kinematic viscosity at 100° C. in the range of 4-6 cSt are described in FIG. 2. For reference, the low viscosity lubricating oil base stocks of this disclosure are compared with typical Group II low viscosity base stocks having the same viscosity range.

The co-processed high viscosity product from the above described process also showed the unique compositional characteristics described herein. Examples of such high viscosity lubricating oil base stocks having kinematic viscosity at 100° C. in the range of 10-12 cSt are described in FIG. 3. For reference, the high viscosity lubricating oil base stocks of this disclosure are compared with typical Group II high viscosity base stocks having the same viscosity range.

As used in FIGS. 2 and 3, "Sats X-0" refers to the amount of one (1) ring cycloparaffins and naphthenoaromatics; "Sats X-2" refers to the amount of two (2) ring cycloparaffins and naphthenoaromatics; "Sats X-4" refers to the amount of three (3) ring cycloparaffins and naphthenoaromatics; "Sats X-6" refers to the amount of four (4) ring cycloparaffins and naphthenoaromatics; "Sats X-8" refers to the amount of five (5) ring cycloparaffins and naphthenoaromatics; "Sats X-10" refers to the amount of six (6) ring cycloparaffins and naphthenoaromatics; and "Sats X2" refers to the amount of isoparaffins. "MM paraffins" refers to monomethyl parafins. "DM paraffins" refers to dimethyl paraffins. "Total Cycloparaffins" refers to the total amount cycloparaffins and naphthenoaromatics. As used in FIGS. 2 and 3, cycloparaffins includes naphthenoaromatics.

As used in FIGS. 2 and 3, viscosity index (VI) was determined according to ASTM method D 2270-93 [1998]. VI is related to kinematic viscosities measured at 40° C. and 100° C. using ASTM Method D 445-01.

As used in FIG. 3, the pour point was measured by ASTM B3983 or D5950-1.

The base stocks with unique compositions (examples in FIGS. 2 and 3) produced by the hydrocracking process exhibit a range of base stock viscosities from 3.5 cst to 13 cst.

For GCMS used herein, approximately 50 milligram of a base stock sample was added to a standard 2 milliliter auto-sampler vial and diluted with methylene chloride solvent to fill the vial. Vials were sealed with septum caps. Samples were run using an Agilent 5975C GCMS (Gas Chromatograph Mass Spectrometer) equipped with an auto-sampler. A non-polar GC column was used to simulate distillation or carbon number elution characteristics off the GC. The GC column used was a Restek Rxi-1 ms. The column dimensions were 30 meters in length×0.32 mm internal diameter with a 0.25 micron film thickness for the stationary phase coating. The GC column was connected to the split/split-less injection port (held at 360° C. and operated in split-less mode) of the GC. Helium in constant pressure mode (~7 PSI) was used for GC carrier phase. The outlet of the GC column was run into mass spectrometer via a transfer line held at a 350° C. The temperature program for the GC column is a follows: 2 minute hold at 100° C., program at 5° C. per minute, 30 minute hold at 350° C. The mass spectrometer was operated using an electron impact ionization source (held at 250° C.) and operated using standard conditions (70 eV ionization). Instrumental control and mass spectral data acquisition were obtained using the Agilent Chemstation software. Mass calibration and instrument tuning performance validated using vendor supplied standard based on instrument auto tune feature.

GCMS retention times for samples were determined relative to a normal paraffin retention based on analysis of standard sample containing known normal paraffins. Then the mass spectrum was averaged. A group type analysis of for saturates fractions based on the characteristic fragment ions was performed. The group type analysis yielded the weight % of the following saturate and aromatic molecular types: total cycloparaffins and naphthenoaromatics, 1-6 ring cycloparaffinic species and naphthenoaromatic species, n-paraffins, monomethyl paraffins (i.e., MM paraffins), and dimethyl paraffins (i.e., DM paraffins). This procedure is similar to industry standard method ASTM D2786—Standard Test Method for Hydrocarbon Types Analysis of Gas-Oil Saturates Fractions by High Ionizing Voltage Mass Spectrometry.

For SFC used herein, a commercial SFC (supercritical fluid chromatograph) system was employed for analysis of lube base stocks. The system was equipped with the following components: a high pressure pump for delivery of supercritical carbon dioxide mobile phase; temperature controlled column oven; auto-sampler with high pressure liquid injection valve for delivery of sample material into mobile phase; flame ionization detector; mobile phase splitter (low dead volume tee); back pressure regulator to keep the $CO_2$ in supercritical state; and a computer and data system for control of components and recording of data signal. For analysis, approximately 75 milligrams of sample was diluted in 2 milliliters of toluene and loaded in standard septum cap autosamper vials. The sample was introduced based via the high pressure sampling valve. The SFC separation was performed using multiple commercial silica packed columns (5 micron with either 60 or 30 angstrom pores) connected in series (250 mm in length either 2 mm or 4 mm ID). Column temperature was held typically at 35 or 40° C. For analysis, the head pressure of columns was typically 250 bar. Liquid CO2 flow rates were typically 0.3 ml/minute for 2 mm ID columns or 2.0 ml/minute for 4 mm ID columns. The samples run were mostly all saturate compounds which will elute before the toluene solvent. The SFC FID signal was integrated into paraffin and naphthenic regions. A SFC (supercritical fluid chromatograph) was used to analyze lube base stocks for split of total paraffins and total naphthenes. A variety of standards employing typical molecular types can be used to calibrate the paraffin/naphthene split for quantification.

For $^{13}C$ NMR used herein, samples were prepared 25-30 wt % in $CDCl_3$ with 7% Chromium (III)-acetylacetonate added as a relaxation agent. $^{13}C$ NMR experiments were performed on a JEOL ECS NMR spectrometer for which the proton resonance frequency was 400 MHz. Quantitative $^{13}C$ NMR Experiments were performed at 27° C. using an inverse gated decoupling experiment with a 45° flip angle, 6.6 seconds between pulses, 64 K data points and 2400 scans. All spectra were referenced to TMS at 0 ppm. Spectra were processed with 0.2-1 Hz of line broadening and baseline correction was applied prior to manual integration. The entire spectrum was integrated to determine the mole % of the different integrated areas as follows: 170-190 ppm aromatic C; 30-29.5 ppm epsilon carbons (long chain methylene carbons); 15-14.5 ppm terminal and pendant propyl groups (% T/P Pr); 14.5-14 ppm methyl at the end of a long chain; and 12-10 ppm pendant and terminal ethyl groups (% P/T Et).

In FIG. 2, 6 inventive samples and 7 comparative examples are provided. Inventive samples 1 and 2 correspond to heavy neutral base stocks formed by block processing of a $C_5$ deasphalted oil feed. Inventive samples 3 and 4 correspond to heavy neutral base stocks formed as an additional base stock product during production of a bright stock by block processing of a $C_5$ deasphalted oil feed. Inventive samples 5 and 6 correspond to heavy neutral base stocks formed by solvent extraction of a heavy vacuum gas oil, followed by hydroprocessing. Inventive samples 1 and 4 were generated using a USY hydrocracking catalyst in the sweet stage, while samples 2 and 3 were generated using a zeolite Beta hydrocracking catalyst in the sweet stage. References 1 to 7 correspond to commercially available Group II heavy neutral base stocks. References 1 and 2 correspond to the reference base stocks used for determination of cycloparaffin performance ratio.

In FIG. 2, lines 1 and 2 provide the kinematic viscosity at 100° C. and 40° C., respectively. The inventive base stocks shown in FIG. 2 have kinematic viscosities at 100° C. between 11.0 cSt and 12.5 cSt. Line 3 provides the viscosity index. The inventive base stocks have viscosity index values between 80 and 120, or between 90 and 110. Line 7 provides the pour point according to ASTM D97. The inventive base stocks have pour points between −5° C. to −45° C. Line 11 shows that the total saturates in the inventive base stocks are 99.8 wt % or more. Lines 12-20 provide simulated distillation values (ASTM D2887) for the various base stocks.

Line 21 shows the epsilon values for the inventive base stocks. Surprisingly, inventive base stocks 1 and 2 have unusually high epsilon values greater than 13.5 epsilon carbon atoms per 100 carbon atoms, or greater than 13.7. By contrast, for inventive base stocks 3 and 4, which are heavy neutral base stocks produced due to conversion when processing a feed for making bright stock, the epsilon values are 8.01 or less, or 7.0 or less, which is unusually low.

Line 23 shows the terminal and pendant carbons in the inventive base stocks. Base stocks 1 and 2 had relatively low values of 0.81 or less terminal and pendant carbon atoms per 100 carbon atoms, while base stocks 3 and 4 had 1.13 terminal and pendant carbons or more per 100 carbon atoms.

Line 24 shows the total paraffin contents for the various base stocks. Base stocks 1 and 2 had 18 wt % or less total paraffins. Lines 25-36 show various breakdowns of the naphthene content, as described above.

In FIG. 3, 4 inventive samples and 5 comparative examples are provided. Inventive samples 1 and 2 correspond to light neutral base stocks formed by block processing of a $C_5$ deasphalted oil feed using a USY hydrocracking catalyst in the sweet stage. Inventive sample 3 corresponds to a light neutral base stock formed as an additional base stock product during production of a bright stock (using sweet stage USY) by block processing of a $C_5$ deasphalted oil feed. Inventive sample 4 corresponds to a light neutral base stock formed by block processing of a $C_5$ deasphalted oil feed using a zeolite Beta hydrocracking catalyst in the sweet stage. References 1 to 5 correspond to commercially available Group II light neutral base stocks. References 1 and 2 correspond to the reference base stocks used for determination of cycloparaffin performance ratio.

In FIG. 3, lines 1 and 2 provide the kinematic viscosity at 100° C. and 40° C., respectively. The inventive base stocks shown in FIG. 3 have kinematic viscosities at 100° C. between 5.0 cSt and 6.0 cSt. Line 3 provides the viscosity index. The inventive base stocks have viscosity index values between 80 and 120, or between 90 and 110. Line 4 provides the pour point according to ASTM D97. The inventive base stocks have pour points between −18° C. to −60° C. or still lower. The total saturates in the inventive base stocks are 99.8 wt % or more.

Line 23 shows the epsilon values for the inventive base stocks. Inventive base stocks 1, 2, and 4 have epsilon values of 10.5 to 12.0 epsilon carbon atoms per 100 carbon atoms. By contrast, for inventive base stock 3, which is a heavy neutral base stock produced due to conversion when processing a feed for making bright stock, the epsilon value was 6.0 or less, or 5.0 or less, which is unusually low.

Line 17 shows the amount of di-methyl (or higher) paraffins in the inventive base stocks. Base stocks 1 to 4 had relatively low values of 16.0 wt % multi-methyl paraffins or less.

Lines 8-15 and 18-22 show various breakdowns of the naphthene content, as described above.

ADDITIONAL EMBODIMENTS

Embodiment 1

A lubricant base stock composition comprising a viscosity index of 80 or more (or 80 to 120); a saturates content of 95 wt % or more (or 98 wt % or more) relative to a total weight of saturates and aromatics in the composition; a sulfur content of 300 wppm or less; a kinematic viscosity at 100° C. of 8.5 cSt to 15 cSt (or 9.0 cSt to 14 cSt); 80.0 wt % or more (or 82.0 wt % or more) of total naphthenes relative to the total weight of saturates and aromatics in the composition; 40.0 wt % or more of 1-ring naphthenes relative to the total weight of saturates and aromatics in the composition; and 2.8 wt % or less of 4+-ring naphthenes relative to the total weight of saturates and aromatics in the composition.

Embodiment 2

The composition of Embodiment 1, wherein the composition comprises 41.0 wt % or more of 1-ring naphthenes relative to the total weight of saturates and aromatics in the composition (or 42.0 wt % or more, or 43.0 wt % or more); or wherein the composition comprises 2.6 wt % or less of 4+-ring naphthenes relative to the total weight of saturates and aromatics in the composition (or 2.4 wt % or less); or wherein the composition comprises 9.5 wt % or less of 3+ ring naphthenes (or 9.0 wt % or less); or a combination thereof.

Embodiment 3

A lubricant base stock composition comprising a viscosity index of 80 or more; a saturates content of 95 wt % or more; optionally 74.0 wt % or more of total naphthenes relative to the total weight of saturates and aromatics in the composition; a sulfur content of 300 wppm or less; a kinematic viscosity at 100° C. of 8.5 cSt to 15 cSt; 2.8 wt % or less of 4+-ring naphthenes; and 9.0 epsilon carbon atoms or less per 100 carbon atoms in the composition.

Embodiment 4

The composition of Embodiment 3, wherein the composition comprises 2.6 wt % or less of 4+-ring naphthenes relative to the total weight of saturates and aromatics in the composition (or 2.4 wt % or less); or wherein the composition comprises 10.0 wt % or less of 3+ ring naphthenes (or 9.0 wt % or less); or a combination thereof.

Embodiment 5

The composition of any of the above embodiments, further comprising 13.5 epsilon carbon atoms or more per 100 carbon atoms in the composition (or 13.7 or more, or 14.0 or more).

Embodiment 6

The composition of any of the above embodiments, further comprising 1.9 wt % or less of 4-ring naphthenes relative to the total weight of saturates and aromatics in the composition (or 1.6 wt % or less, or 1.4 wt % or less).

Embodiment 7

The composition of any of the above embodiments, wherein the composition further comprises a cycloparaffin performance ratio of 1.20 to 1.34 (or 1.25 to 1.32); or wherein the composition further comprises a ratio of 1-ring naphthenes to 2+ ring naphthenes of 1.0 or more (or 1.1 or more, or 1.2 or more); or wherein the composition further comprises 2.79 alpha carbon atoms or more per 100 carbon atoms in the composition (or 2.85 or more); or a combination thereof.

Embodiment 8

The composition of any of the above embodiments, wherein the composition further comprises 0.82 terminal and pendant propyl groups or less per 100 carbon atoms of the composition (or 0.80 or less, or 0.75 or less); or wherein the composition further comprises 1.10 terminal and pendant propyl groups or more per 100 carbon atoms of the composition (or 1.15 or more).

Embodiment 9

A lubricant base stock composition comprising a viscosity index of 80 or more (or 80 to 120); a saturates content of 98 wt % or more; a sulfur content of 300 wppm or less; a kinematic viscosity at 100° C. of 3.5 cSt to 6.5 cSt (or 4.0 cSt to 6.0 cSt); a total naphthenes content of 81.0 wt % or more (or 83.0 wt % or more, or 85.0 wt % or more); and 41.0 wt % or more of 1-ring naphthenes.

Embodiment 10

The composition of Embodiment 9, wherein the composition further comprises 9.0 wt % or less of 3-ring naphthenes relative to the total weight of saturates and aromatics in the composition (or 8.5 wt % or less, or 7.5 wt % or less); or wherein the composition further comprises 1.9 wt % or less of 4-ring naphthenes (or 1.7 wt % or less); or a combination thereof.

Embodiment 11

The composition of Embodiment 9 or 10, wherein the composition comprises 43.0 wt % or more of 1-ring naphthenes relative to the total weight of saturates and aromatics in the composition (or 45.0 wt % or more, or 47.0 wt % or more); or wherein the composition further comprises 2.9 wt % or less of 4+-ring naphthenes relative to the total weight of saturates and aromatics in the composition (or 2.6 wt % or less); or wherein the composition further comprises 11.0 wt % or less of 3+-ring naphthenes relative to the total weight of saturates and aromatics in the composition (or 10.5 wt % or less, or 9.5 wt % or less); or a combination thereof.

Embodiment 12

The composition of any of Embodiments 9-11, further comprising 16.0 wt % or less of multi-branched paraffins relative to the total weight of saturates and aromatics in the composition (or 14.0 wt % or less).

Embodiment 13

A lubricant base stock composition comprising a viscosity index of 80 or more (or 80 to 120); a saturates content of 98 wt % or more; a sulfur content of 300 wppm or less; a kinematic viscosity at 100° C. of 3.5 cSt to 6.5 cSt (or 4.0 cSt to 6.0 cSt); 1.8 wt % or less of 4-ring naphthenes (or 1.6 wt % or less); 0.9 wt % or less of 5-ring naphthenes (or 0.6 wt % or less); and 8.0 epsilon carbon atoms or less per 100 carbon atoms in the composition.

Embodiment 14

The composition of Embodiment 13, further comprising 0.5 wt % or less of monomethyl paraffins relative to a weight of saturates and aromatics in the composition.

Embodiment 15

The composition of Embodiment 13 or 14, wherein the composition comprises 2.0 wt % or less of 4+-ring aromatics relative to a weight of saturates and aromatics in the composition; or wherein the composition comprises 0.7 wt % or less of 5+-ring aromatics relative to a weight of saturates and aromatics in the composition; or a combination thereof.

Embodiment 16

The composition of any of Embodiments 13 to 15, wherein the composition comprises 45.0 wt % or more of 1-ring naphthenes relative to the total weight of saturates and aromatics in the composition (or 47.0 wt % or more, or 49.0 wt % or more); or wherein the composition comprises 81.0 wt % or more of naphthenes relative to the total weight of saturates and aromatics in the composition (or 83.0 wt % or more); or a combination thereof.

Embodiment 17

The composition of any of the above embodiments, wherein the composition further comprises a pour point of −6° C. or less (or −9° C. or less, or −12° C. or less).

Embodiment 18

A lubricating oil comprising the base stock blend of any of the above embodiments and a minor amount of one or more additives chosen from an antiwear additive, a viscosity modifier, an antioxidant, a detergent, a dispersant, a pour point depressant, a corrosion inhibitor, a metal deactivator, a seal compatibility additive, a demulsifying agent, an anti-foam agent, inhibitor, an anti-rust additive, and combinations thereof, the lubricating oil optionally comprising at least one of an engine oil, an industrial lubricating oil, and a marine lubricating oil.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

The invention claimed is:

1. A lubricant base stock composition comprising a viscosity index of 80 or more; a saturates content of 95 wt % or more; a sulfur content of 300 wppm or less; a kinematic viscosity at 100° C. of 8.5 cSt to 15 cSt; 2.8 wt % or less of 4+-ring naphthenes; 9.0 epsilon carbon atoms or less per 100 carbon atoms in the composition; and 0.82 or less terminal and pendant propyl groups per 100 carbon atoms in the composition.

2. The composition of claim 1, further comprising a cycloparaffin performance ratio of 1.20 to 1.34.

3. The composition of claim 1, further comprising 74.0 wt % or more of total naphthenes relative to the total weight of saturates and aromatics in the composition.

4. The composition of claim 1, further comprising 1.6 wt % or less of 4-ring naphthenes relative to the total weight of saturates and aromatics in the composition.

5. The composition of claim 1, wherein the composition comprises 2.6 wt % or less of 4+-ring naphthenes relative to the total weight of saturates and aromatics in the composition; or wherein the composition comprises 10.0 wt % or less of 3+-ring naphthenes; or a combination thereof.

6. A lubricant base stock composition comprising a viscosity index of 80 or more; a saturates content of 98 wt % or more; a sulfur content of 300 wppm or less; a kinematic viscosity at 100° C. of 3.5 cSt to 6.5 cSt; a total naphthenes content of 81.0 wt % or more; 41.0 wt % or more of 1-ring naphthenes; and 8 epsilon carbon atoms or less per 100 carbon atoms in the composition.

7. The composition of claim 6, wherein the composition further comprises 9.0 wt % or less of 3-ring naphthenes relative to the total weight of saturates and aromatics in the composition; or wherein the composition further comprises 1.9 wt % or less of 4-ring naphthenes; or a combination thereof.

8. The composition of claim 6, wherein the composition comprises 83.0 wt % or more of naphthenes relative to the total weight of saturates and aromatics in the composition.

9. The composition of claim 6, wherein the composition comprises 43.0 wt % or more of 1-ring naphthenes relative to the total weight of saturates and aromatics in the composition.

10. The composition of claim 6, wherein the composition further comprises 2.9 wt % or less of 4+-ring naphthenes relative to the total weight of saturates and aromatics in the composition; or wherein the composition further comprises 11.0 wt % or less of 3+-ring naphthenes relative to the total weight of saturates and aromatics in the composition; or a combination thereof.

11. The composition of claim 6, further comprising 16.0 wt % or less of multi-branched paraffins relative to the total weight of saturates and aromatics in the composition.

12. The composition of claim 6, wherein the composition comprises a kinematic viscosity at 100° C. of 4.0 cSt to 6.0 cSt.

13. The composition of claim 6, wherein the composition further comprises a pour point of −12° C. or less.

14. The composition of claim 6, further comprising at least one additive to form a formulated lubricant.

15. A lubricant base stock composition comprising a viscosity index of 80 or more; a saturates content of 98 wt % or more; a sulfur content of 300 wppm or less; a kinematic viscosity at 100° C. of 3.5 cSt to 6.5 cSt; 1.8 wt % or less of 4-ring naphthenes; 0.9 wt % or less of 5-ring naphthenes; and 8.0 epsilon carbon atoms or less per 100 carbon atoms in the composition.

16. The composition of claim 15, further comprising 0.5 wt % or less of monomethyl paraffins relative to a weight of saturates and aromatics in the composition.

17. The composition of claim 15, wherein the composition comprises 1.6 wt % or less of 4-ring aromatics relative to a weight of saturates and aromatics in the composition; or wherein the composition comprises 0.6 wt % or less of 5-ring aromatics relative to a weight of saturates and aromatics in the composition; or a combination thereof.

18. The composition of claim 15, wherein the composition comprises 2.0 wt % or less of 4+-ring aromatics relative to a weight of saturates and aromatics in the composition; or wherein the composition comprises 0.7 wt % or less of 5+-ring aromatics relative to a weight of saturates and aromatics in the composition; or a combination thereof.

19. The composition of claim 15, wherein the composition comprises 45.0 wt or more of 1-ring naphthenes relative to the total weight of saturates and aromatics in the composition.

20. The composition of claim 15, wherein the composition comprises 81.0 wt % or more of naphthenes relative to the total weight of saturates and aromatics in the composition.

21. The composition of claim 1, further comprising dimethyl paraffins.

* * * * *